US012358280B2

(12) United States Patent
Kishida

(10) Patent No.: US 12,358,280 B2
(45) Date of Patent: Jul. 15, 2025

(54) INKJET PRINTER AND METHOD OF CONTROLLING INKJET PRINTER

(71) Applicant: MIMAKI ENGINEERING CO., LTD., Nagano (JP)

(72) Inventor: Yutaro Kishida, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 49 days.

(21) Appl. No.: 17/912,035

(22) PCT Filed: Mar. 10, 2021

(86) PCT No.: PCT/JP2021/009482
§ 371 (c)(1),
(2) Date: Sep. 15, 2022

(87) PCT Pub. No.: WO2021/187266
PCT Pub. Date: Sep. 23, 2021

(65) Prior Publication Data
US 2023/0129407 A1 Apr. 27, 2023

(30) Foreign Application Priority Data
Mar. 18, 2020 (JP) ................................ 2020-047918
Mar. 18, 2020 (JP) ................................ 2020-047919

(51) Int. Cl.
*B41J 2/045* (2006.01)

(52) U.S. Cl.
CPC ....... *B41J 2/04563* (2013.01); *B41J 2/04581* (2013.01); *B41J 2202/12* (2013.01)

(58) Field of Classification Search
CPC ................................................... B41J 2/04563
See application file for complete search history.

(56) References Cited

U.S. PATENT DOCUMENTS

2009/0027437 A1* 1/2009 Azami .................. B41J 2/0459 347/17
2009/0322816 A1* 12/2009 Ihara ....................... B41J 2/072 347/17

(Continued)

FOREIGN PATENT DOCUMENTS

JP 2002196127 7/2002
JP 2009178996 8/2009

(Continued)

OTHER PUBLICATIONS

"Office Action of Japan Counterpart Application", issued on Jan. 25, 2024, with English translation thereof, p. 1-p. 8.

(Continued)

*Primary Examiner* — Shelby L Fidler
(74) *Attorney, Agent, or Firm* — JCIPRNET

(57) ABSTRACT

An inkjet printer that includes an inkjet head in which a plurality of ink flow paths are formed is provided. In this inkjet printer, a plurality of nozzles from which ink is ejected and a plurality of ink flow paths to which the plurality of nozzles are connected are formed in an inkjet head. The inkjet head includes a plurality of ejection energy generation elements that make the plurality of respective nozzles eject ink. Based on an ink flow rate which is a flow rate of ink flowing into each of the plurality of ink flow paths and internal temperature or external temperature of the inkjet head, a controller of the inkjet printer estimates the ink temperature in each of the plurality of ink flow paths, and controls drive voltage applied to the plurality of ejection energy generation elements based on the result of the estimation.

5 Claims, 14 Drawing Sheets

| External temperature | Ink flow rate | Ink temperature in ink flow path | | | |
|---|---|---|---|---|---|
| | | Ink flow path 3c | Ink flow path 3d | Ink flow path 3e | Ink flow path 3f |
| T1 | Q1 | T11 | T21 | T31 | T41 |
| | Q2 | T12 | T22 | T32 | T42 |
| | Q3 | T13 | T23 | T33 | T43 |
| | ⋮ | ⋮ | ⋮ | ⋮ | ⋮ |
| T2 | Q1 | T111 | T121 | T131 | T141 |
| | Q2 | T112 | T122 | T132 | T142 |
| | Q3 | T113 | T123 | T133 | T143 |
| | ⋮ | ⋮ | ⋮ | ⋮ | ⋮ |
| T3 | Q1 | T211 | T221 | T231 | T241 |
| | Q2 | T212 | T222 | T232 | T242 |
| | Q3 | T213 | T223 | T233 | T243 |
| | ⋮ | ⋮ | ⋮ | ⋮ | ⋮ |
| ⋮ | ⋮ | ⋮ | ⋮ | ⋮ | ⋮ |

(56) References Cited

U.S. PATENT DOCUMENTS

| | | | | |
|---|---|---|---|---|
| 2011/0242155 | A1* | 10/2011 | Bansyo .................... | B41J 2/175<br>347/6 |
| 2013/0050317 | A1* | 2/2013 | Koyama ............. | B41J 2/04581<br>347/10 |
| 2015/0097903 | A1* | 4/2015 | Iijima ...................... | B41J 2/175<br>347/102 |
| 2015/0251454 | A1* | 9/2015 | Ochi ...................... | B41J 2/1707<br>347/102 |

FOREIGN PATENT DOCUMENTS

| | | |
|---|---|---|
| JP | 2013123883 | 6/2013 |
| JP | 2015168243 | 9/2015 |
| JP | 2017177758 | 10/2017 |
| JP | 2020001368 | 1/2020 |

OTHER PUBLICATIONS

"International Search Report (Form PCT/ISA/210) of PCT/JP2021/009482," mailed on May 18, 2021, with English translation thereof, pp. 1-4.

* cited by examiner

| External temperature | Ink flow rate | Ink temperature in ink flow path | | | |
|---|---|---|---|---|---|
| | | Ink flow path 3c | Ink flow path 3d | Ink flow path 3e | Ink flow path 3f |
| T1 | Q1 | T11 | T21 | T31 | T41 |
| | Q2 | T12 | T22 | T32 | T42 |
| | Q3 | T13 | T23 | T33 | T43 |
| | ⋮ | ⋮ | ⋮ | ⋮ | ⋮ |
| T2 | Q1 | T111 | T121 | T131 | T141 |
| | Q2 | T112 | T122 | T132 | T142 |
| | Q3 | T113 | T123 | T133 | T143 |
| | ⋮ | ⋮ | ⋮ | ⋮ | ⋮ |
| T3 | Q1 | T211 | T221 | T231 | T241 |
| | Q2 | T212 | T222 | T232 | T242 |
| | Q3 | T213 | T223 | T233 | T243 |
| | ⋮ | ⋮ | ⋮ | ⋮ | ⋮ |
| ⋮ | ⋮ | ⋮ | ⋮ | ⋮ | ⋮ |

FIG. 8

| Temperature (°C) | Drive voltage (V) |
|---|---|
| 39.0 | V1+1.656 |
| 40.0 | V1+1.380 |
| 41.0 | V1+1.104 |
| 42.0 | V1+0.828 |
| 43.0 | V1+0.552 |
| 44.0 | V1+0.276 |
| 45.0 | V1+0.000 |

FIG. 9

INKJET PRINTER AND METHOD OF CONTROLLING INKJET PRINTER

CROSS-REFERENCE TO RELATED APPLICATION

This application is a 371 application of the International PCT application serial no. PCT/JP2021/009482, filed on Mar. 10, 2021, which claims the priority benefits of Japan Patent Application No. 2020-047918, filed on Mar. 18, 2020, and Japan Patent Application No. 2020-047919, filed on Mar. 18, 2020. The entirety of each of the above-mentioned patent applications is hereby incorporated by reference herein and made a part of this specification.

TECHNICAL FIELD

The present invention relates to an inkjet printer that performs printing by ejecting ink. The present invention also relates to a method of controlling the inkjet printer.

BACKGROUND ART

Conventionally, an inkjet printer including an inkjet head that ejects UV ink that is ultraviolet-curable ink has been known (refer to, for example, Patent Literature 1). The inkjet printer described in Patent Literature 1 includes a head-external ink heating device that heats the ink supplied to the inkjet head, from the outside of the inkjet head. A plurality of nozzles that eject ink are formed in the inkjet head. Further, a plurality of ink flow paths to which the plurality of nozzles are connected are formed in the inkjet head. For example, four ink flow paths through which color ink of different colors flows are formed in the inkjet head. The inkjet head includes a drive unit that makes the plurality of nozzles eject the ink.

In the inkjet printer described in Patent Literature 1, the outer circumference of the inkjet head is wrapped by a film-shaped heater that heats the ink to be ejected from the plurality of nozzles, to reduce the viscosity of the ink. The inkjet head includes a temperature sensor for detecting the temperature of the ink in the ink flow path. The temperature sensor is disposed in the inkjet head. The heater is controlled based on the temperature detected by the temperature sensor.

Furthermore, an inkjet printer (inkjet recording apparatus) including an inkjet head that ejects ink has conventionally been known (refer to, for example, Patent Literature 2). In the inkjet printer described in Patent Literature 2, a plurality of nozzles arranged in a certain direction are formed in the inkjet head. The inkjet head includes a plurality of piezoelectric elements that make the plurality of respectively nozzles eject the ink. The plurality of nozzles are divided into a plurality of groups the number of which is smaller than the number of nozzles in the arrangement direction of the nozzles, and the plurality of piezoelectric elements are divided into a plurality of groups corresponding to the grouping of the nozzles.

In the inkjet printer described in Patent Literature 2, the same drive voltage is applied to piezoelectric elements belonging to the same group, and the drive voltage can be adjusted for each group of piezoelectric elements. To each group of piezoelectric elements, drive voltage selected from a plurality of values of drive voltage is applied. The drive voltage applied to the piezoelectric elements of each group is set based on data on the amount of ink ejected from each nozzle of the inkjet head measured in advance.

With the inkjet printer described in Patent Literature 2, the amount of ink ejected from a nozzle close to an ink supply port tends to be small, whereas the amount of ink ejected from nozzles in the vicinity of both ends of the inkjet head that are far the ink supply port tends to be large. In view of this, for this inkjet printer, the drive voltage applied to a group of piezoelectric elements corresponding to a group of nozzles close to the ink supply port is set to be higher than that applied to a group of piezoelectric elements corresponding to a group of nozzles far from the ink supply port.

Furthermore, an inkjet printer including an inkjet head that ejects UV ink that is ultraviolet-curable ink has conventionally been known (refer to, for example, Patent Literature 2). The inkjet printer described in Patent Literature 2 includes a head-external ink heating device that heats the ink supplied to the inkjet head from outside of the inkjet head. A plurality of nozzles that eject the UV ink and ink flow paths connected to the plurality of nozzles are formed in the inkjet head.

In the inkjet printer described in Patent Literature 1, the outer circumference of the inkjet head is wrapped by a film-shaped heater that heats the UV ink to be ejected from the plurality of nozzles, to reduce the viscosity of the ink. The inkjet head includes a temperature sensor for detecting the temperature of the ink in the ink flow path. The temperature sensor is disposed in the inkjet head. The heater is controlled based on the temperature detected by the temperature sensor.

CITATION LIST

Patent Literature

Patent Literature 1: Japanese Unexamined Patent Publication No. 2015-168243

Patent Literature 2: Japanese Unexamined Patent Publication No. 2002-196127

SUMMARY OF INVENTION

Technical Problems

Through studies, the inventors of the present application have found out that print quality might be compromised depending on conditions for the printing, with an inkjet printer having a plurality of ink flow paths formed in an inkjet head such as the one described in Patent Literature 1.

In view of this, the present invention provides an inkjet printer that includes an inkjet head in which a plurality of ink flow paths are formed, and can prevent the print quality from being compromised regardless of the conditions for the printing. The present invention also provides a method of controlling an inkjet printer that includes an inkjet head in which a plurality of ink flow paths are formed, with which the print quality can be prevented from being compromising regardless of the conditions for the printing.

Further, in the inkjet printer described in Patent Literature 2, a plurality of nozzles and piezoelectric elements are grouped in the nozzle arrangement direction. In the inkjet printer, the drive voltage can be adjusted for each group of piezoelectric elements. The drive voltage applied to the piezoelectric element of each group is set based on the data on the amount of ink ejected from each nozzle of the inkjet head measured in advance. Thus, with this inkjet printer, a variation in the ejected amount of ink among the plurality of nozzles can be suppressed in the nozzle arrangement direction. As a result, the print quality can be prevented from being compromised.

However, the inventors of the present application have found out through studies that, even when the plurality of piezoelectric elements are grouped and the drive voltage applied to the piezoelectric elements is set as described above as in the inkjet printer described in Patent Literature 2, the print quality cannot be prevented from compromising depending on the conditions for the printing.

In view of this, the present invention provides an inkjet printer that performs printing by ejecting ink from a plurality of nozzles arranged in a certain direction, and can prevent the print quality from being compromised regardless of the conditions for the printing. The present invention also provides a method of controlling an inkjet printer that performs printing by ejecting ink from a plurality of nozzles arranged in a certain direction, and can prevent the print quality from being compromised regardless of the conditions for the printing.

Solutions to Problems

The inventors of the present application have conducted various studies to solve the problems described above. As a result, the inventors of the present application have found that, first of all, the print quality of an inkjet printer having a plurality of ink flow paths formed in an inkjet head is likely to be compromised depending on the conditions for the printing, when the printing is performed using ink, UV ink in particular, having viscosity that is high at a normal temperature and largely varies due to temperature change. Furthermore, the inventors of the present application has found that when the printing is performed by the inkjet printer having the plurality of ink flow paths formed in the inkjet head using the ink having viscosity that is high at normal temperature and largely varies due to temperature change, the print quality is more likely to be compromised if the ink supplied to the inkjet head fails to be sufficiently heated.

Through further studies, the inventors of the present application have found that in the inkjet printer having the plurality of ink flow paths formed in the inkjet head, for example, if a variation in the amount of ink flowing in among the plurality of ink flow paths and the like cause a variation in ink temperature among the plurality of ink flow paths, the viscosity of ink eject varies among the plurality of ink flow paths, leading to a variation in the amount and the speed of ejection of ink through the ink flow paths from the plurality of nozzles, resulting in the print quality being compromised.

An inkjet printer of the present invention, which is based on such a new finding, is configured to perform printing by ejecting ink, and includes: an inkjet head in which a plurality of nozzles that eject ink and a plurality of ink flow paths to which the plurality of nozzles are connected are formed; and a controller configured to control the inkjet printer, wherein the inkjet head includes a plurality of ejection energy generation elements each configured to make a corresponding one of the plurality of nozzles eject the ink, and the controller estimates temperature of the ink in each of the plurality of ink flow paths based on an ink flow rate that is a flow rate of the ink flowing into each of the plurality of ink flow paths and a first temperature that is a temperature inside or outside the inkjet head, and controls drive voltage applied to the plurality of ejection energy generation elements based on a result of the estimation.

A method of controlling an inkjet printer including an inkjet head in which a plurality of nozzles that eject ink and a plurality of ink flow paths to which the plurality of nozzles are connected are formed, the inkjet head including a plurality of ejection energy generation elements each configured to make a corresponding one of the plurality of nozzles eject the ink according to the present invention, which is based on the new finding described above, includes: estimating temperature of the ink in each of the plurality of ink flow paths based on an ink flow rate that is a flow rate of the ink flowing into each of the plurality of ink flow paths and a first temperature that is a temperature inside or outside the inkjet head; and controlling drive voltage applied to the plurality of ejection energy generation elements based on a result of the estimation.

In the present invention, based on the ink flow rate which is a flow rate of the ink flowing into each of the plurality of ink flow paths and the first temperature which is the internal or the external temperature of the inkjet head, the ink temperature in each of the plurality of ink flow paths is estimated, and the drive voltage applied to the plurality of ejection energy generation elements is controlled based on the result of the estimation. Thus, with the present invention, for example, even when the viscosity of ink ejected from the plurality of nozzles varies among the ink flow paths due to a variation in the ink temperature among the ink flow paths caused by a variation in the flow rate of ink flowing into each of the plurality of ink flow paths and the like, the drive voltage applied to each of the plurality of ejection energy generation elements can be controlled based on the result of the estimation on the ink temperature in each of the plurality of ink flow paths, to suppress a variation in the amount and the speed of the ink ejected from the plurality of nozzles among the plurality of ink flow paths. Thus, in the present invention, the deterioration of the print quality can be suppressed regardless of the conditions for the printing.

In the present specification, "drive voltage" includes drive voltage in a case where voltage control is performed on the ejection energy generation elements, as well as effective voltage in a case where Pulse Width Modulation (PWM) control is performed on the ejection energy generation elements.

Preferably, the inkjet printer of the present invention further includes an external temperature sensor configured to detect an external temperature of the inkjet printer, and the controller determines the ink flow rate in each of the plurality of ink flow paths based on print data input to the controller, and sets the external temperature detected by the external temperature sensor as the first temperature. With this configuration, the ink flow rate and the first temperature can be relatively easily obtained, with the mechanical configuration of the inkjet printer simplified.

According to the present invention, for example, an ink temperature in each of the plurality of ink flow paths is measured in advance in accordance with various values of the ink flow rate and the first temperature, and a result of the measurement is stored in advance in the controller, and the controller estimates the ink temperature in each of the plurality of ink flow paths, based on the result of the measurement stored in the controller, as well as on the ink flow rate and the first temperature. In this case, the processing by the controller for estimating the ink temperature in each of the plurality of ink flow paths can be simplified.

According to the present invention, for example, the inkjet head includes an in-head heater configured to heat ink in the inkjet head, and the ink temperature in each of the plurality of ink flow paths is measured in advance in accordance with a target heating temperature of the ink heated by the in-head heater, as well as with various values of the ink flow rate and the first temperature, and a result of the measurement is stored in advance in the controller.

An inkjet printer of the present invention which is based on the new finding described above is configured to perform printing by ejecting ink, and includes: an inkjet head in which a plurality of nozzles that eject ink and a plurality of ink flow paths to which the plurality of nozzles are connected are formed; a plurality of ink temperature sensors each configured to detect ink temperature in a corresponding one of the plurality of ink flow paths; and a controller configured to control the inkjet printer, wherein the inkjet head includes a plurality of ejection energy generation elements each configured to make a corresponding one of the plurality of nozzles eject the ink, and the controller controls drive voltage applied to the plurality of ejection energy generation elements based on a result of the detection by the plurality of ink temperature sensors.

A method of controlling an inkjet printer including an inkjet head in which a plurality of nozzles that eject ink and a plurality of ink flow paths to which the plurality of nozzles are connected are formed, and a plurality of ink temperature sensors configured to detect ink temperature in each of the plurality of ink flow paths, the inkjet head including a plurality of ejection energy generation elements each configured to make a corresponding one of the plurality of nozzles eject the ink according to the present invention, which is based on the new finding described above includes controlling drive voltage applied to the plurality of ejection energy generation elements based on a result of the detection by the plurality of ink temperature sensors.

In the present invention, the drive voltage applied to the plurality of ejection energy generation elements is controlled based on the result of detection by the plurality of ink temperature sensors for detecting the ink temperature in the plurality of respective ink flow paths. Thus, with the present invention, for example, even when the viscosity of ink ejected from the plurality of nozzles varies among the ink flow paths due to a variation in the ink temperature among the ink flow paths caused by a variation in the flow rate of ink flowing into each of the plurality of ink flow paths and the like, the drive voltage applied to each of a plurality of ejection energy generation elements can be controlled based on the result of the detection by the plurality of ink temperature sensors, to suppress a variation in the amount and the speed of the ink ejected from the plurality of nozzles among the plurality of ink flow paths. Thus, in the present invention, the deterioration of the print quality can be suppressed regardless of the conditions for the printing.

According to the present invention, preferably, the ink temperature sensors are each disposed in vicinity of a corresponding one of the plurality of ink flow paths or in a corresponding one of the ink flow paths. With this configuration, the ink temperature sensor in each of the plurality of ink flow paths can be accurately detected with the plurality of in-head temperature sensor.

According to the present invention, for example, the inkjet printer further includes an ink heating mechanism configured to heat ink supplied to the inkjet head, wherein the ink heating mechanism includes a heating unit body of a block shape in which a plurality of heating mechanism ink flow paths in which ink flows are formed, and a head-external heater configured to heat the heating unit body, each of the plurality of heating mechanism ink flow paths is connected to a corresponding one of the plurality of ink flow paths, and the inkjet head includes an in-head heater configured to heat ink in the inkjet head.

In this case, the ink temperature in the plurality of ink flow paths is likely to vary among the ink flow paths, due to the variation in the length and the cross-sectional area of the plurality of heating mechanism ink flow paths among the heating mechanism ink flow paths, the variation in the distance between each of the plurality of heating mechanism ink flow paths and the head-external heater among the ink flow paths, and the variation in the distance between the ink flow path and the in-head heater among the plurality of ink flow paths. Still, in the present invention, even when the ink temperature in the ink flow path varies among the ink flow paths, the drive voltage applied to the plurality of ejection energy generation elements can be controlled to suppress the variation in the amount and the speed of the ink ejected from the plurality of nozzles among the ink flow paths.

The inventors of the present application have conducted various studies to solve the problems described above. As a result, first of all, the inventors of the present application have found that even when the drive voltage applied to the piezoelectric element is set as in the inkjet printer described in Patent Literature 1, the amount and the speed of the ink ejected from the plurality of nozzles may vary in the arrangement direction of the nozzles depending on the conditions for the printing, and thus the print quality may be compromised. The inventors of the present application have further found that when the printing is performed using ink, such as UV ink in particular, having viscosity that is high at normal temperature and largely varies due to temperature change, the amount and the speed of the ink ejected from the plurality of nozzles are likely to vary in the arrangement direction of the nozzles depending on the conditions for the printing, resulting in a higher risk of the print quality being compromised.

An inkjet printer that performs printing using ink, such as UV ink, having viscosity that is high at normal temperature and largely varies due to temperature change typically includes a head-external ink heating device and a heater for heating an inkjet head as in the inkjet printer described in Patent Literature 2 in many cases. The inventors of the present application have found that in such an inkjet printer, when the ink supplied to the inkjet head fails to be sufficiently heated, the amount and the speed of the ink ejected from the plurality of nozzles are likely to vary in the arrangement direction of the nozzles, resulting in a higher risk of print quality being compromised.

Through further studies, the inventors of the present application have found that when the ink temperature in the inkjet head varies along the arrangement direction of the nozzles, the viscosity of the ink ejected from the plurality of nozzles varies along the arrangement direction of the nozzles. Thus, even when the drive voltage applied to the piezoelectric element is set as in the inkjet printer described in Patent Literature 1, the amount and the speed of the ink ejected from the plurality of nozzles vary along the arrangement direction of the nozzles, resulting in compromised print quality.

An inkjet printer according to the present invention, which is based on such a new finding, is configured to perform printing by ejecting ink, and includes: an inkjet head configured to eject the ink; and a controller configured to control the inkjet printer, wherein a nozzle row including a plurality of nozzles arranged in a certain direction is formed in the inkjet head, the inkjet head includes a plurality of ejection energy generation elements each configured to make a corresponding one of the plurality of nozzles eject the ink, and based on an ink flow rate that is a flow rate of ink flowing into the inkjet head and on inflowing ink temperature that is temperature of the ink flowing into the inkjet head, the controller estimates ink temperature at each position in a first direction in the inkjet head, the first direction being the direction in which the plurality of nozzles forming the nozzle row are arranged, and controls drive voltage applied to the plurality of ejection energy generation elements based on a result of the estimation.

A method of controlling an inkjet printer including an inkjet head configured to eject ink, a nozzle row including a plurality of nozzles arranged in a certain direction being formed in the inkjet head, the inkjet head including a plurality of ejection energy generation elements each configured to make a corresponding one of the plurality of nozzles eject the ink according to the present invention, which is based on the new finding described above, includes: based on an ink flow rate that is a flow rate of ink flowing into the inkjet head and on inflowing ink temperature that is temperature of the ink flowing into the inkjet head, estimating ink temperature at each position in a first direction in the inkjet head, the first direction being the direction in which the plurality of nozzles forming the nozzle row are arranged; and controlling drive voltage applied to the plurality of ejection energy generation elements based on a result of the estimation.

In the present invention, the ink temperature at each position in the first direction, which is the arrangement direction of the plurality of nozzles forming the nozzle row, in the inkjet head is estimated based on the ink flow rate and the inflowing ink temperature, and the drive voltage applied to the plurality of ejection energy generation elements is controlled based on the result of the estimation. Thus, in the present invention, even when the ink temperature varies along the first direction in the inkjet head to result in variation, along the first direction, in the viscosity of the ink ejected from the plurality of nozzles, the drive voltage applied to the plurality of ejection energy generation elements can be controlled based on the result of estimating the ink temperature at each position in the first direction in the inkjet head, to suppress the variation, along the first direction, in the amount and the speed of the ink ejected from the plurality of nozzles. Thus, in the present invention, the deterioration of the print quality can be suppressed regardless of the conditions for the printing.

In the present specification, "drive voltage" includes drive voltage in a case where voltage control is performed on the ejection energy generation elements, as well as effective voltage in a case where Pulse Width Modulation (PWM) control is performed on the ejection energy generation elements.

Preferably, according to the present invention, the inkjet printer further includes an external temperature sensor configured to detect an external temperature of the inkjet printer, wherein the controller determines the ink flow rate based on print data input to the controller, and determines the inflowing ink temperature based on the ink flow rate determined and the external temperature detected by the external temperature sensor. With this configuration, the ink flow rate and the inflowing ink temperature can be relatively easily obtained, with the mechanical configuration of the inkjet printer simplified.

According to the present invention, for example, the ink temperature at each position in the first direction in the inkjet head is measured in advance in accordance with various values of the ink flow rate and the inflowing ink temperature, and a result of the measurement is stored in advance in the controller, and the controller estimates the ink temperature at each position in the first direction in the inkjet head, based on the result of the measurement stored in the controller, as well as on the ink flow rate and the inflowing ink temperature. In this case, the processing by the controller for estimating the ink temperature at each position in the first direction in the inkjet head can be simplified.

For example, according to the present invention, the inkjet head includes an in-head heater configured to heat ink in the inkjet head, and the ink temperature at each position in the first direction in the inkjet head is measured in advance in accordance with a target heating temperature of the ink heated by the in-head heater, as well as with various values of the ink flow rate and the inflowing ink temperature, and a result of the measurement is stored in advance in the controller.

An inkjet printer according to the present invention, which is based on the new finding described above, is configured to perform printing by ejecting ink, and includes: an inkjet head configured to eject the ink; a plurality of in-head temperature sensors configured to detect ink temperature in the inkjet head; and a controller configured to control the inkjet printer, wherein a nozzle row including a plurality of nozzles arranged in a certain direction is formed in the inkjet head, the inkjet head includes a plurality of ejection energy generation elements each configured to make a corresponding one of the plurality of nozzles eject the ink, the plurality of in-head temperature sensors are arranged at an interval in a first direction, the first direction being the direction in which the plurality of nozzles forming the nozzle row are arranged, and the controller controls drive voltage applied to the plurality of ejection energy generation elements, based on a result of the detection by the plurality of in-head temperature sensors.

A method of controlling an inkjet printer including an inkjet head configured to eject ink, and a plurality of in-head temperature sensors configured to detect ink temperature in the inkjet head, a nozzle row including a plurality of nozzles arranged in a certain direction being formed in the inkjet head, the inkjet head including a plurality of ejection energy generation elements each configured to make a corresponding one of the plurality of nozzles eject the ink, the plurality of in-head temperature sensors being arranged at an interval in a first direction, the first direction being the direction in which the plurality of nozzles forming the nozzle row are arranged according to the present invention, which is based on the new finding described above, includes controlling drive voltage applied to the plurality of ejection energy generation elements based on a result of the detection by the plurality of in-head temperature sensors.

In the present invention, based on the result of the detection by the plurality of in-head temperature sensors arranged at an interval in the first direction, which is the arrangement direction of the plurality of nozzles forming the nozzle row, the drive voltage applied to the plurality of ejection energy generation elements is controlled. Thus, in the present invention, even when the ink temperature varies along the first direction in the inkjet head, resulting in a variation, along the first direction, in the viscosity of the ink ejected from the plurality of nozzles, the drive voltage applied to the plurality of ejection energy generation elements can be controlled based on the result of the detection by the plurality of in-head temperature sensors, to suppress the variation, along the first direction, in the amount and the speed of the ink ejected from the plurality of nozzles. Thus, in the present invention, the deterioration of the print quality can be suppressed regardless of the conditions for the printing.

According to the present invention, preferably, the plurality of nozzles are grouped in advance in the first direction into a plurality of nozzle groups forming the nozzle row, the in-head temperature sensor is disposed at each of positions where the plurality of respective nozzle groups are disposed in the first direction, and the controller applies same drive voltage to part the plurality of ejection energy generation elements that makes the nozzles belonging to same one of the nozzle groups eject the ink. With this configuration, based on the result of the detection by the plurality of in-head temperature sensors, the drive voltage applied to each group of a plurality of ejection energy generation elements that make the nozzles belonging to the same nozzle group eject ink can be controlled, to more effectively suppress the variation, along the first direction, in the amount and the speed of the ink ejected from the plurality of nozzles.

According to the present invention, preferably, the controller is able to control the drive voltage applied to each of the plurality of ejection energy generation elements individually. With this configuration, based on the result of the estimation on the ink temperature at each position in the first direction in the inkjet head and the result of the detection by the plurality of in-head temperature sensors, the plurality of nozzles forming the nozzle row can be grouped at any distinction position in the first direction. Thus, the drive voltage applied to the plurality of ejection energy generation elements can be more flexibly controlled, to more effectively suppress the variation, along the first direction, in the amount and the speed of the ink ejected from the plurality of nozzles.

According to the present invention, for example, the inkjet head includes an in-head heater configured to heat the ink in the inkjet head, an ink inflow port through which the ink flows toward the inkjet head is formed on one end side of the inkjet head in the first direction, temperature of ink on the one end side in the first direction in the inkjet head is lower than temperature of ink on another end side in the first direction in the inkjet head, and the controller sets drive voltage for part of the ejection energy generation elements that makes part of the nozzles disposed on the one end side in the first direction eject the ink to be higher than drive voltage for part of the ejection energy generation elements that makes part of the nozzles disposed on the other end side in the first direction eject the ink. In this case, the variation, along the first direction, in the amount and the speed of the ink ejected from the plurality of nozzles is suppressed, even when the ink temperature on one end side in the first direction in the inkjet head is low.

According to the present invention, for example, a change in the ink temperature in one end side part in the first direction in the inkjet head is larger than a change in the ink temperature in another end side part in the first direction in the inkjet head, in the one end side part in the first direction in the inkjet head, the plurality of nozzles forming the nozzle row are grouped more in detail in the first direction than in the other end side part in the first direction in the inkjet head, and the controller applies same drive voltage to part of the plurality of ejection energy generation elements that makes part of the nozzles belonging to same one of the groups eject the ink. In this case, even when a change in the ink temperature in the one end side part in the first direction in the inkjet head is large, the variation, along the first direction, in the amount and the speed of the ink ejected from the plurality of nozzles can be effectively suppressed.

According to the present invention, for example, the inkjet head includes an in-head heater configured to heat the ink in the inkjet head, temperature of the ink on both end sides in the first direction in the inkjet head is lower than temperature of ink on a center side in the first direction in the inkjet head, and the controller sets drive voltage for part of the ejection energy generation elements that makes part of the nozzles disposed on the both end sides in the first direction eject the ink to be higher than drive voltage for part of the ejection energy generation elements that makes part of the nozzles disposed on the center side in the first direction eject the ink. In this case, the variation, along the first direction, in the amount and the speed of the ink ejected from the plurality of nozzles is suppressed, even when the ink temperature on both end sides in the first direction in the inkjet head is low.

Effect of the Invention

With the present invention as described above, for an inkjet printer that includes an inkjet head in which a plurality of ink flow paths are formed, the print quality can be prevented from being compromised regardless of the conditions for the printing.

Furthermore, with the present invention as described above, for an inkjet printer that performs printing by ejecting ink from a plurality of nozzles arranged in a certain direction, the print quality can be prevented from being compromised regardless of the conditions for the printing.

BRIEF DESCRIPTION OF THE DRAWINGS

FIG. 8 is a diagram illustrating an example of a result of measuring the temperature of the ink in each of the ink flow paths stored in a controller illustrated in FIG. 4.

FIG. 9 is a diagram illustrating an example of a table stored in the controller illustrated in FIG. 4.

DESCRIPTION OF EMBODIMENTS

Hereinafter, an embodiment of the present invention will be described with reference to the drawings.

[First Invention Group]

(Configuration of Inkjet Printer)

Figure 1:
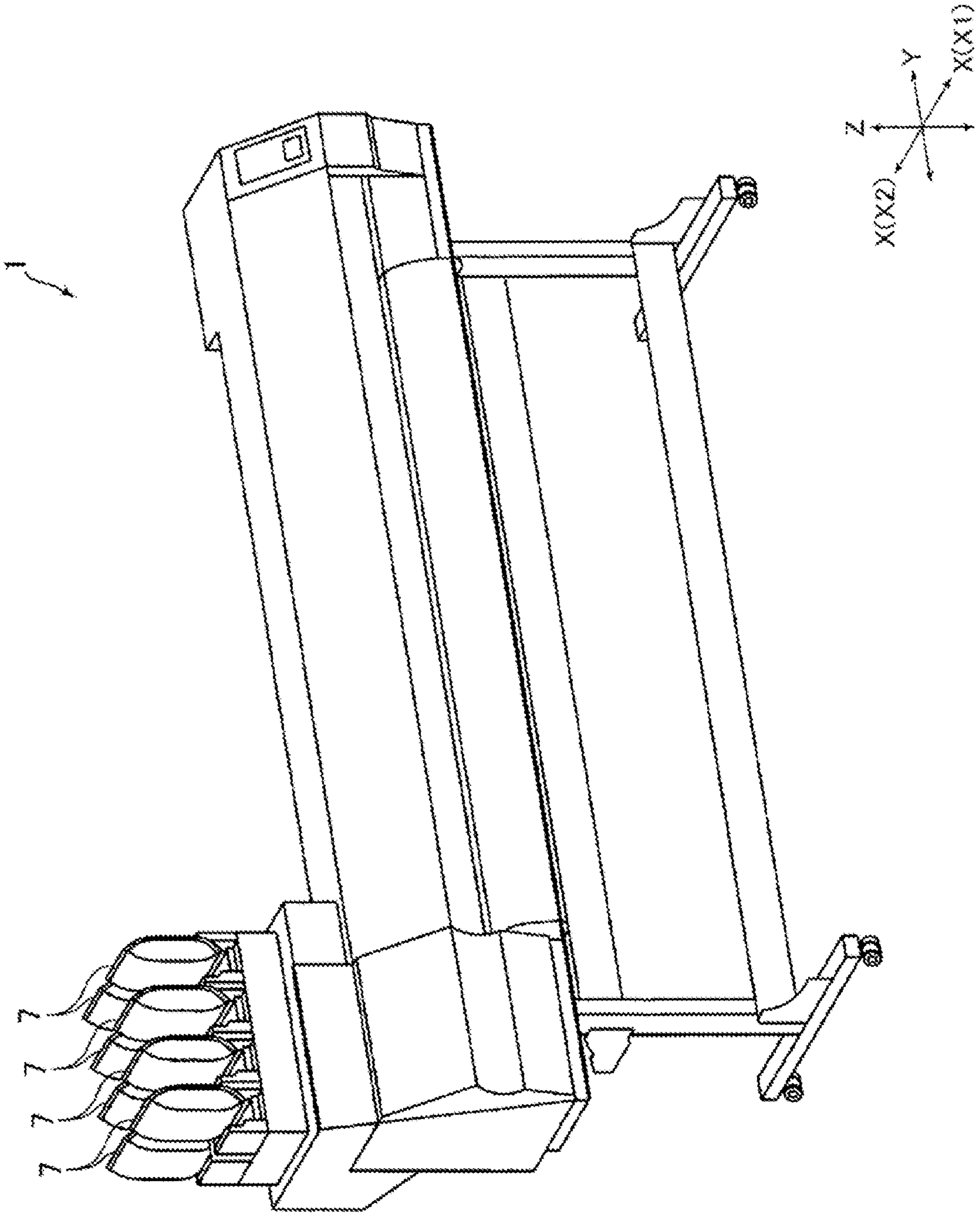
FIG. 1 is a perspective view of an inkjet printer according to an embodiment of the present invention.
Figure 2:
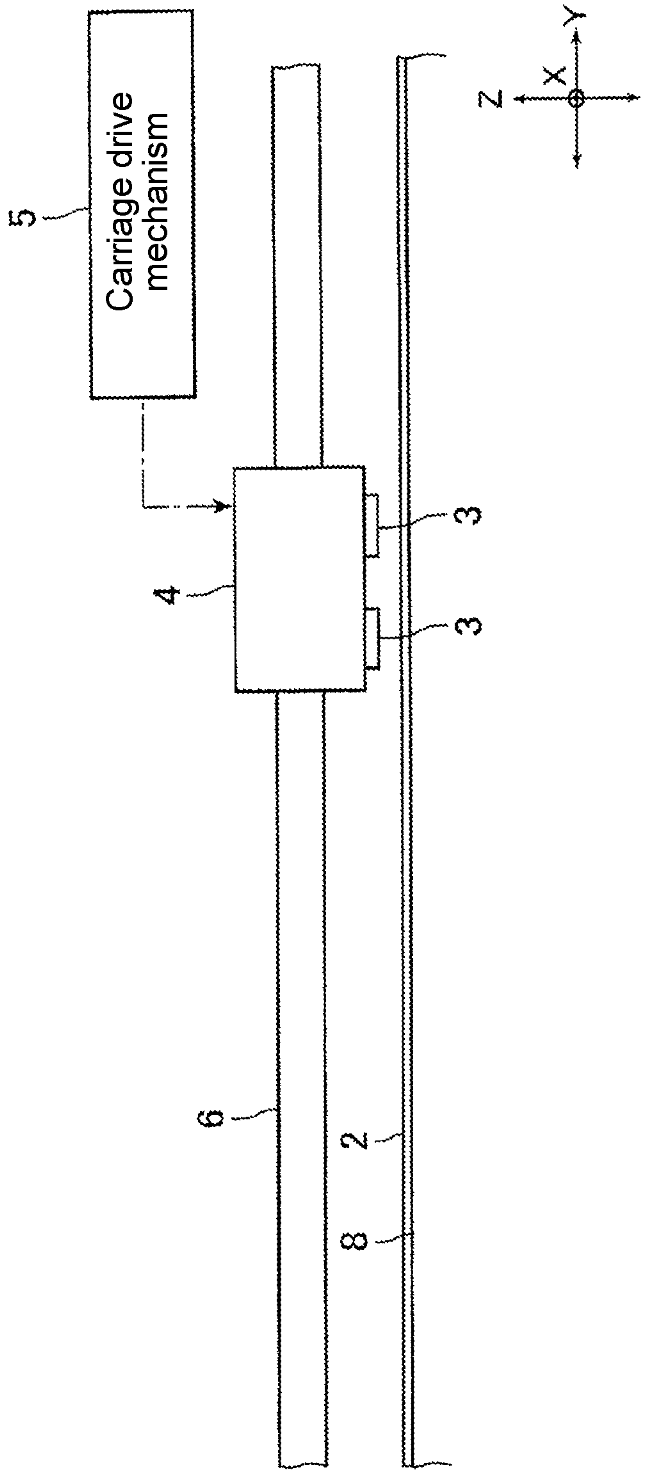
FIG. 2 is a schematic view illustrating a configuration of the inkjet printer illustrated in FIG. 1.
Figure 3:
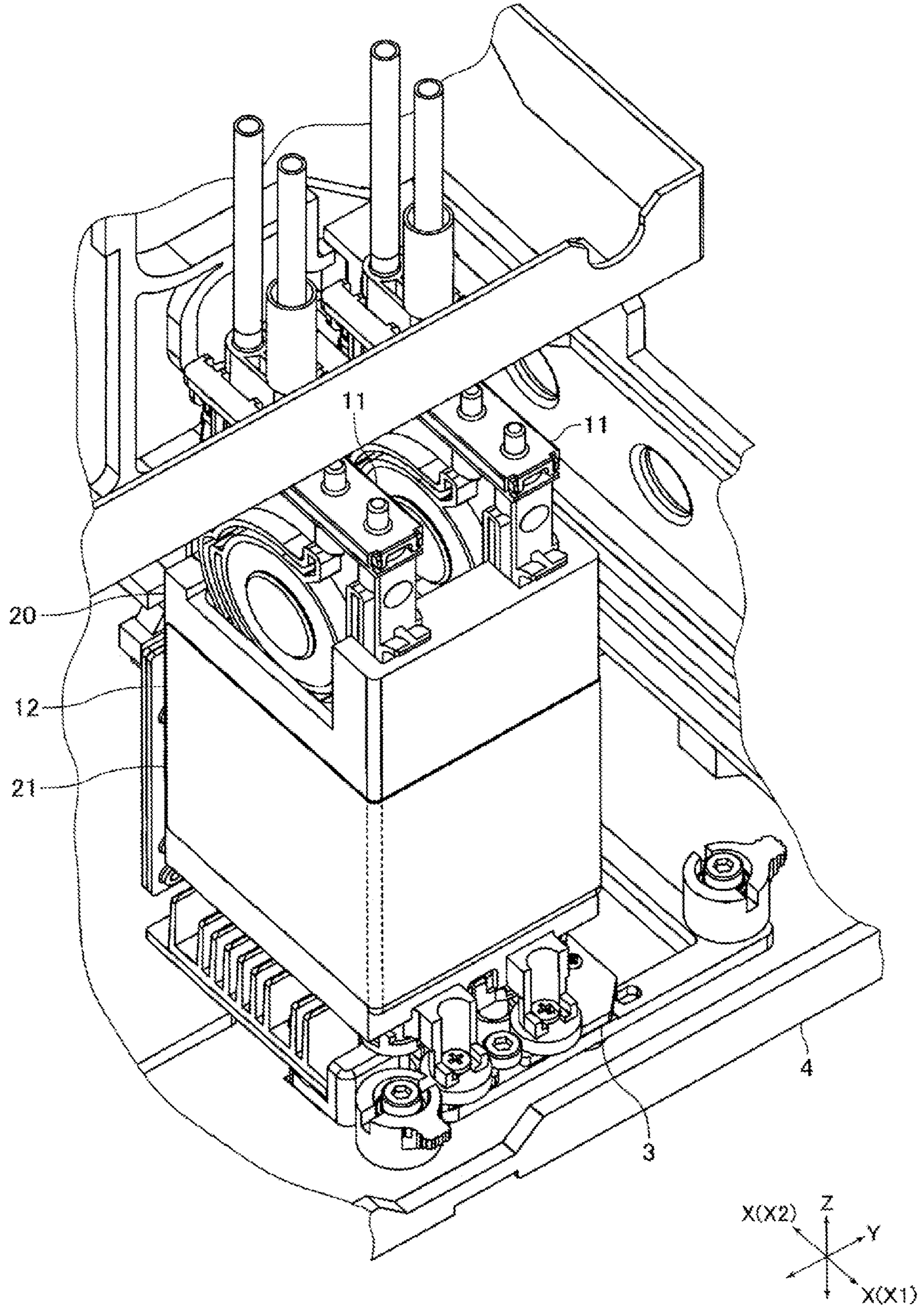
FIG. 3 is a perspective view of part of a peripheral portion of a carriage illustrated in FIG. 2.
Figure 4:
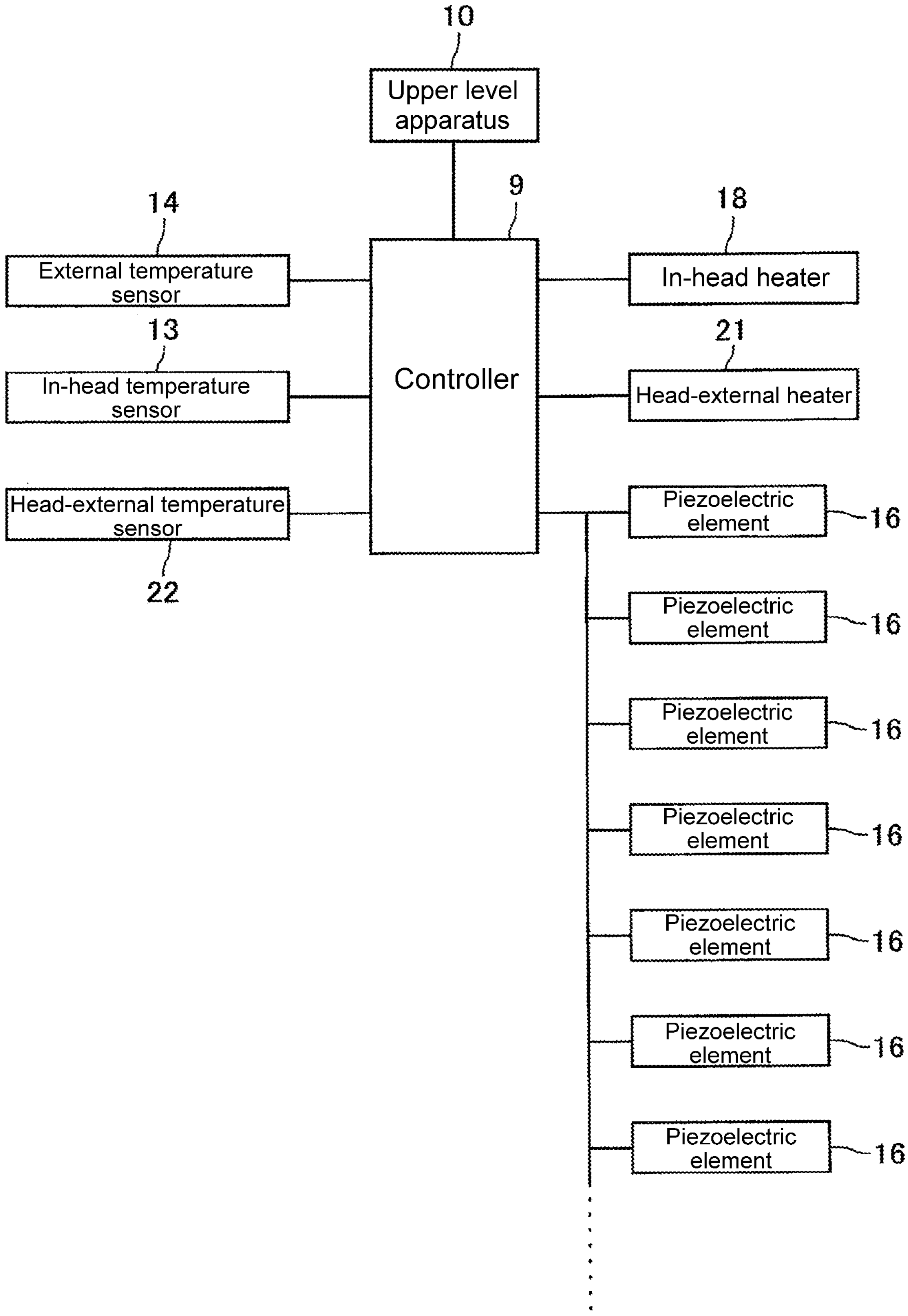
FIG. 4 is a block diagram illustrating a configuration of the inkjet printer illustrated in FIG. 1.
Figure 5:
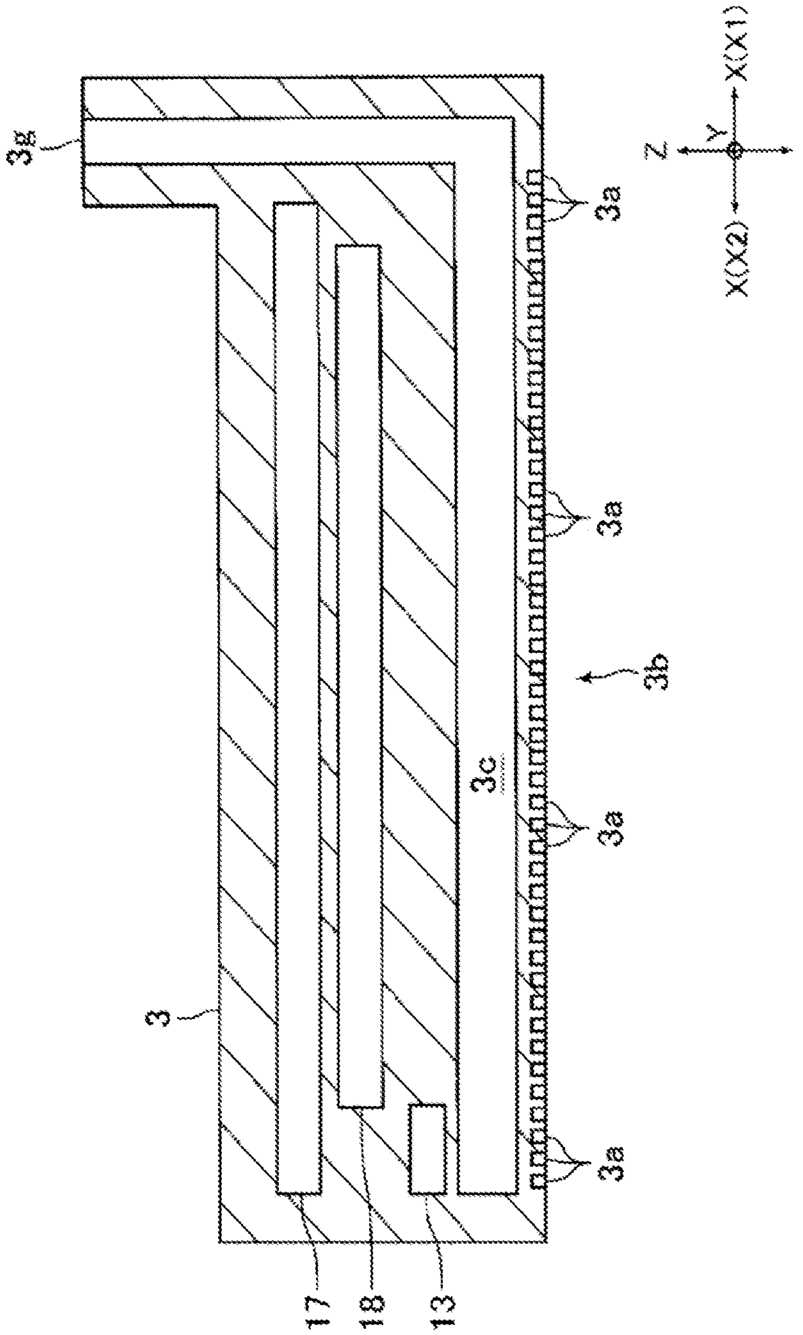
FIG. 5 is a cross-sectional view illustrating a schematic configuration of an inkjet head illustrated in FIG. 2.
Figure 6:
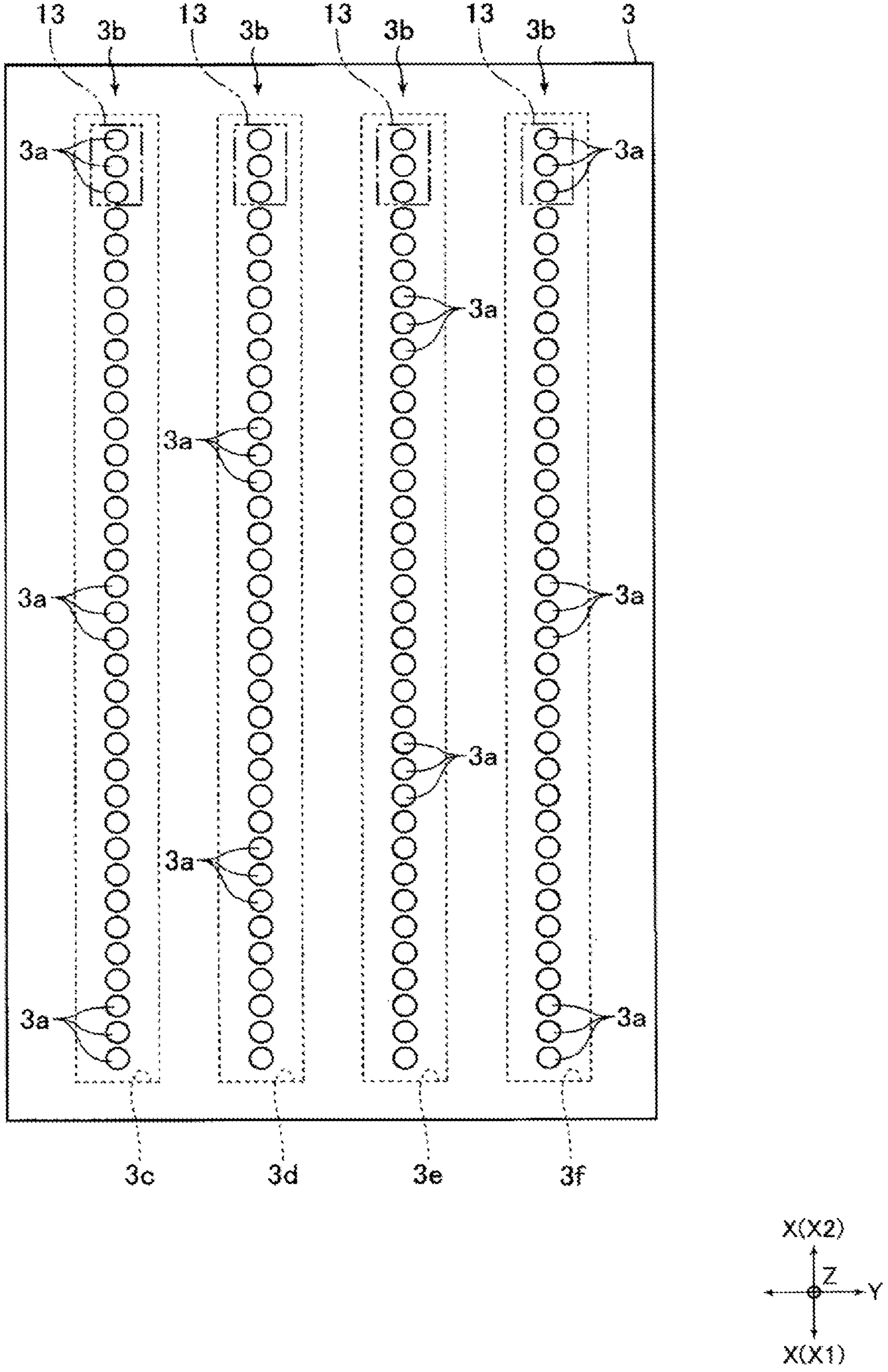
FIG. 6 is a bottom view illustrating a schematic configuration of the inkjet head illustrated in FIG. 2.
Figure 7:
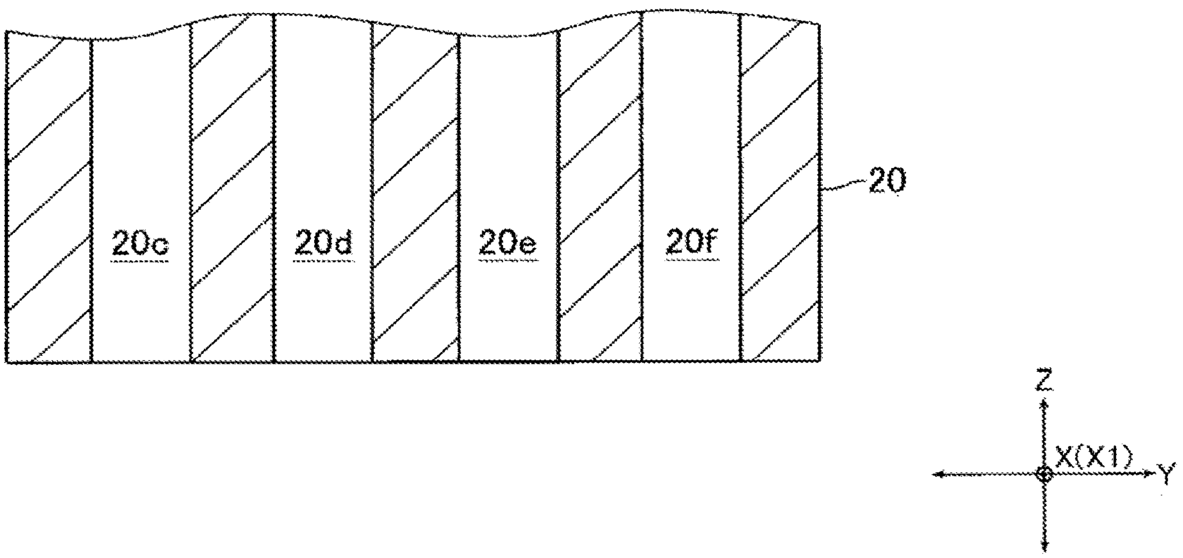
FIG. 7 is a cross-sectional view illustrating a configuration of a heating unit body illustrated in FIG. 3.
Figure 10:
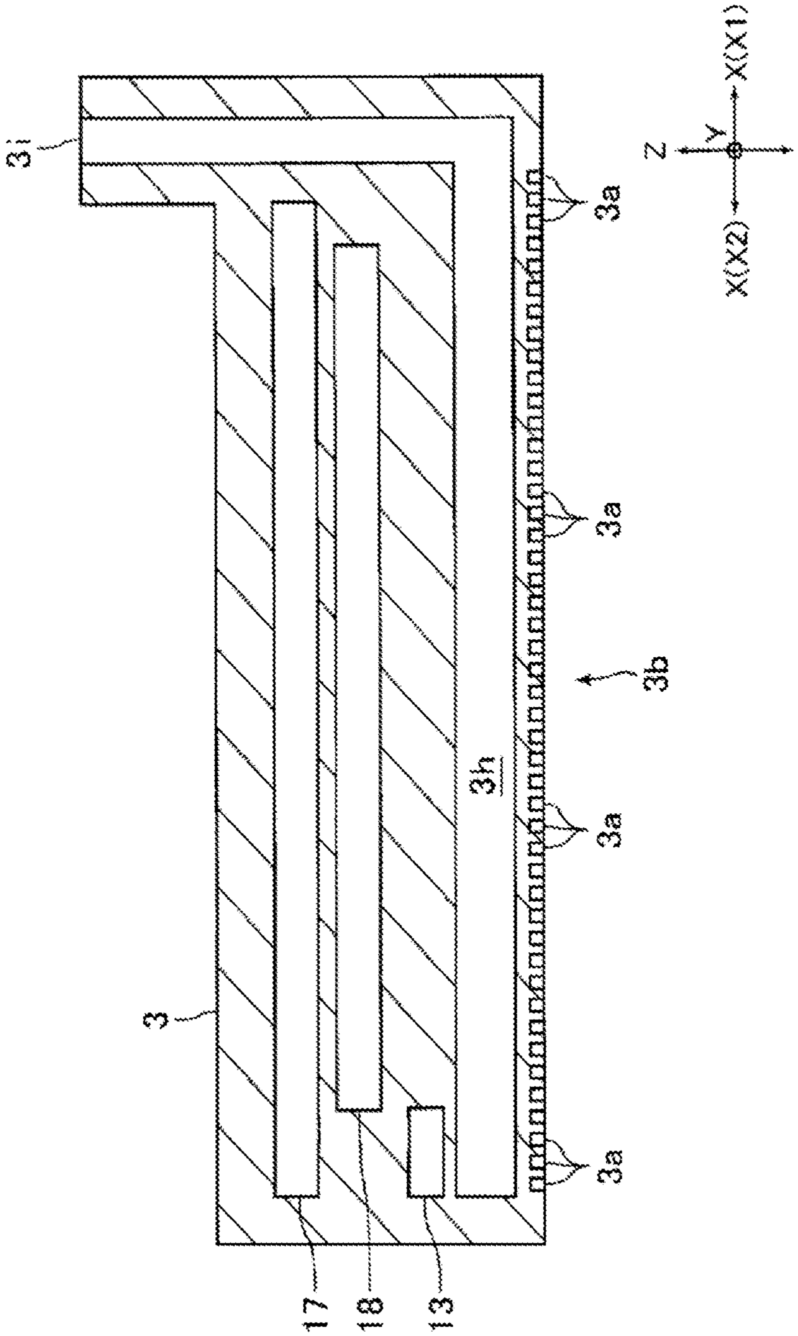
FIG. 10 is a cross-sectional view illustrating a schematic configuration of the inkjet head illustrated in FIG. 2.

FIG. 1 is a perspective view of an inkjet printer 1 according to an embodiment of the present invention. FIG. 2 is a schematic view illustrating a configuration of the inkjet printer 1 illustrated in FIG. 1. FIG. 3 is a perspective view of part of a peripheral portion of a carriage 4 illustrated in FIG. 2. FIG. 4 is a block diagram illustrating a configuration of the inkjet printer 1 illustrated in FIG. 1. FIG. 5 is a cross-sectional view illustrating a schematic configuration of an inkjet head 3 illustrated in FIG. 2. FIG. 6 is a bottom view illustrating a schematic configuration of the inkjet head 3 illustrated in FIG. 2. FIG. 7 is a cross-sectional view illustrating a configuration of a heating unit body 20 illustrated in FIG. 3.

An inkjet printer 1 of the present embodiment (hereinafter referred to as "printer 1") is, for example, an inkjet printer for commercial use, and performs printing on a print medium 2 by ejecting ink. The ink used in the printer 1 has a viscosity that is high at normal temperature and largely varies due to temperature change. In the present embodiment, ultraviolet-curable ink (UV ink) is used in the printer 1. The print medium 2 is, for example, a paper sheet, fabric, resin film, or the like for printing.

The printer 1 includes: an inkjet head 3 (hereinafter, referred to as a "head 3") that ejects ink toward the print medium 2; a carriage 4 on which the head 3 is mounted; a carriage drive mechanism 5 that moves the carriage 4 in a main scanning direction (such as a Y direction in FIG. 1 and the like); a guide rail 6 that guides the carriage 4 in the main scanning direction; and a plurality of ink tanks 7 storing ink to be supplied to the head 3. In the following description, the main scanning direction (Y direction) is referred to as a "left-right direction", and a sub scanning direction (an X direction in FIG. 1 and the like) orthogonal to the up-down direction (a Z direction in FIG. 1 and the like) and the main scanning direction is referred to as a "front-rear direction". Furthermore, an X1 direction side in FIG. 1 and the like which is one side in the front-rear direction is referred to as a "front" side, and an X2 direction side in FIG. 1 and the like which is the other side in the front-rear direction is referred to as a "rear" side.

The printer 1 further includes: a pressure adjustment mechanism 11 for adjusting the internal pressure of the head 3; an ink heating mechanism 12 for heating the ink supplied to the head 3; an in-head temperature sensor 13 for detecting the temperature of the ink inside the head 3; and an external temperature sensor 14 for detecting the temperature (external temperature) outside the printer 1. The printer 1 further includes a controller 9 that controls the printer 1. An upper level apparatus 10, such as a personal computer (PC), for the printer 1 is electrically connected to the controller 9.

A plurality of nozzles 3*a* that eject the ink are formed in the lower surface of the head 3. The plurality of nozzles 3*a* are arranged at a constant pitch along the front-rear direction, and the plurality of nozzles 3*a* arranged in the front-rear direction form a nozzle row 3*b*. In the present embodiment, a plurality of the nozzle rows 3*b* are formed in the lower surface of the head 3. The plurality of nozzle rows 3*b* are arranged in the left-right direction. A plurality of ink flow paths 3*c* to 3*f* to which the plurality of nozzle rows 3*b* are respectively connected are formed in the head 3. In other words, the plurality of ink flow paths 3*c* to 3*f* to which the plurality of nozzles 3*a* are connected formed in the head 3. One end of each of the ink flow paths 3*c* to 3*f* serves as an ink inflow port 3*g* into which the ink flows toward the head 3. The ink inflow port 3*g* is formed on the front end side of the head 3.

In the present embodiment, for example, four nozzle rows 3*b* are formed in the lower surface of the head 3, and four ink flow paths 3*c* to 3*f* connected to the four respective nozzle rows 3*b* are formed in the head 3. The ink flow paths 3*c* to 3*f* are arranged in this order from one end side to the other end side of the head 3 in the left-right direction. Colors of the ink flowing in the four ink flow paths 3*c* to 3*f* are different from each other for example. However, ink of the same color may flow in at least two of the four ink flow paths 3*c* to 3*f*.

A platen 8 is disposed below the head 3. The printing medium 2 is placed on the platen 8 when the printing is performed. A medium feeding mechanism (not illustrated) conveys the print medium 2 placed on the platen 8 in the front-rear direction. For example, the carriage drive mechanism 5 includes: two pulleys; a belt that is wound across the two pulleys and is partially fixed to the carriage 4; and a motor that rotates the pulleys. An ultraviolet irradiator (not illustrated) is mounted on the carriage 4 and irradiates the ink ejected from the head 3 with ultraviolet light to cure the ink.

The head 3 includes a plurality of piezoelectric elements 16 that make the plurality of respective nozzles 3*a* eject the ink. The head further includes a driver integrated circuit (IC) 17 that applies drive voltage to the piezoelectric elements 16 to drive the piezoelectric elements 16; and an in-head heater 18 that heats the ink inside the head 3. The piezoelectric elements 16, the driver IC 17, and the in-head heater 18 are disposed inside the head 3. The piezoelectric elements 16 are electrically connected to the controller 9. The piezoelectric element 16 according to the present embodiment is an ejection energy generation element. The driver IC 17 may not be disposed in the head 3. In such a case, the driver IC 17 is mounted on a circuit board installed in the carriage 4 for example.

The in-head temperature sensor 13 is disposed inside the head 3. In the present embodiment, a single in-head temperature sensor 13 is disposed inside the head 3. For example, as illustrated in FIG. 5, the in-head temperature sensor 13 is disposed above the rear end portions of the ink flow paths 3*c* to 3*f*. The in-head temperature sensor 13 is disposed outside the ink flow paths 3*c* to 3*f*. The in-head temperature sensor 13 indirectly detects the temperature of the ink (specifically, the ink in the ink flow paths 3*c* to 3*f*) inside the head 3 by detecting the temperature of a body frame of the head 3. The in-head temperature sensor 13 is electrically connected to the controller 9. The in-head temperature sensor 13 may be disposed in any of the ink flow paths 3*c* to 3*f*.

The in-head heater 18 functions to reduce the viscosity of the ink inside the head 3, by heating the body frame of the head 3 to thus heat the ink (specifically, the ink in the ink flow paths 3*c* to 3*f*) inside the head 3. The in-head heater 18 is disposed above the ink flow paths 3*c* to 3*f*. The in-head heater 18 is disposed at the center part of the interior the head 3. In the present embodiment, the ink in the ink flow paths 3*d* and 3*e* is more effectively heated by the heat from the in-head heater 18, than the ink in the ink flow paths 3*c* and 3*f*. Thus, the level of heating of the ink in the ink flow paths 3*c* to 3*f* by the in-head heater 18 varies among the ink flow paths 3*c* to 3*f*.

The in-head heater 18 is electrically connected to the controller 9. The controller 9 controls the in-head heater 18 based on the result of the detection by the in-head temperature sensor 13. Specifically, when the in-head temperature sensor 13 detects a temperature that is lower than a predetermined set temperature, the controller 9 drives the in-head heater 18 and stops the in-head heater 18 once the temperature detected by the in-head temperature sensor 13 reaches or exceeds the set temperature. The in-head heater 18 includes a temperature sensor (not illustrated) for detecting an overheating state of the in-head heater 18. The temperature sensor is a thermistor for example that is attached to the in-head heater 18.

The ink is supplied from the ink tank 7 to the pressure adjustment mechanism 11. Specifically, the ink tank 7 is disposed above the pressure adjustment mechanism 11, and the ink is supplied from the ink tank 7 to the pressure adjustment mechanism 11 by means of the head difference. The ink heating mechanism 12 is disposed between the pressure adjustment mechanism 11 and the head 3, in the ink supply path to the head 3. The ink is supplied to the ink heating mechanism 12 from the pressure adjustment mechanism 11, and is supplied to the head 3 from the ink heating mechanism 12. The pressure adjustment mechanism 11 and the ink heating mechanism 12 are mounted on the carriage 4.

The ink heating mechanism 12 is a head-external ink heating device disposed outside the head 3. The ink heating mechanism 12 functions to lower the viscosity of the ink supplied to the head 3 by heating the ink supplied to the head 3. The ink heating mechanism 12 is disposed above the head 3. The ink heating mechanism 12 includes a heating unit body 20 that is formed in a block shape, a head-external heater 21 attached to the heating unit body 20, and a head-external temperature sensor 22 attached to the heating unit body 20.

The heating unit body 20 is formed to be in a substantially rectangular parallelepiped shape as a whole. The heating unit body 20 is made of a metal material having high thermal conductivity such as an aluminum alloy. A plurality of heating mechanism ink flow paths 20*c* to 20*f* in which ink flows are formed in the heating unit body 20. In the present embodiment, four heating mechanism ink flow paths 20*c* to 20*f* respectively connected to the four ink flow paths 3*c* to 3*f* of the head 3 are formed in the heating unit body 20. For example, the heating mechanism ink flow path 20*c* is connected to the ink flow path 3*c*, the heating mechanism ink flow path 20*d* is connected to the ink flow path 3*d*, the heating mechanism ink flow path 20*e* is connected to the ink flow path 3*e*, and the heating mechanism ink flow path 20*f* is connected to the ink flow path 3*f*.

The length (flow path length) of at least one of the four heating mechanism ink flow paths 20*c* to 20*f* is different from the flow path length of another one of the heating mechanism ink flow paths 20*c* to 20*f*. For example, the flow path length of the heating mechanism ink flow path 20*c* is the same as the flow path length of the heating mechanism ink flow path 20*f*, the flow path length of the heating mechanism ink flow path 20*d* is the same as the flow path length of the heating mechanism ink flow path 20*e*, and the flow path lengths of the heating mechanism ink flow paths 20*c* and 20*f* are different from the flow path lengths of the heating mechanism ink flow paths 20*d* and 20*e*. Alternatively, the four heating mechanism ink flow paths 20*c* to 20*f* have flow path lengths different from each other.

The average value of cross-sectional areas of at least one of the four heating mechanism ink flow paths 20*c* to 20*f* (cross-sectional areas of the ink flow paths 20*c* to 20*f* orthogonal to the longitudinal direction) is different from the average value of the cross-sectional areas of another one of the heating mechanism ink flow paths 20*c* to 20*f*. For example, the average value of the cross-sectional areas of the heating mechanism ink flow path 20*c* is the same as the average value of the cross-sectional areas of the heating mechanism ink flow path 20*f*, the average value of the cross-sectional areas of the heating mechanism ink flow path 20*d* is the same as the average value of the cross-sectional areas of the heating mechanism ink flow path 20*e*, and the average values of the cross-sectional areas of the heating mechanism ink flow paths 20*c* and 20*f* are different from the average values of the cross-sectional areas of the heating mechanism ink flow paths 20*d* and 20*e*. Alternatively, the four heating mechanism ink flow paths 20*c* to 20*f* have the average values of the cross-sectional areas different from each other.

The head-external heater 21 heats the heating unit body 20. The head-external heater 21 is formed in a sheet shape and thus is a sheet heater. The head-external heater 21 is attached to a side surface of the heating unit body 20. In the present embodiment, a single head-external heater 21 is bent at 90 degrees at two portions, to be attached to left and right side surfaces and the front surface of the heating unit body 20. The head-external heater 21 and the head-external temperature sensor 22 are electrically connected to the controller 9. The controller 9 controls the head-external heater 21 based on the result of the detection by the head-external temperature sensor 22.

A distance between at least one of the four heating mechanism ink flow paths 20*c* to 20*f* and the head-external heater 21 is different from a distance between another one of the heating mechanism ink flow paths 20*c* to 20*f* and the head-external heater 21. For example, the distance between the heating mechanism ink flow path 20*c* and the head-external heater 21 is the same as the distance between the heating mechanism ink flow path 20*f* and the head-external heater 21, the distance between the heating mechanism ink flow path 20*d* and the head-external heater 21 is the same as the distance between the heating mechanism ink flow path 20*e* and the head-external heater 21, and the distance between the heating mechanism ink flow path 20*c*, 20*f* and the head-external heater 21 is different from the distance between the heating mechanism ink flow path 20*d*, 20*e* and the head-external heater 21.

The pressure adjustment mechanism 11 is attached to the ink heating mechanism 12. In the present embodiment, two pressure adjustment mechanisms 11 are attached to a single ink heating mechanism 12. The pressure adjustment mechanism 11 has a lower part contained in the heating unit body 20. For example, the pressure adjustment mechanism 11 is a mechanical pressure damper having the same configuration as a pressure adjustment damper described in Japanese Unexamined Patent Publication No. 2011-46070, and mechanically adjusts the internal pressure of the head 3 without using a pressure adjustment pump. The pressure adjustment mechanism 11 adjusts the internal pressure of the head 3 (the internal pressure of the ink flow paths 3*c* to 3*f*) to be a negative pressure. Two ink flow paths (not illustrated) are formed in the pressure adjustment mechanism 11.

The external temperature sensor 14 is mounted on the carriage 4, for example. Alternatively, the external temperature sensor 14 is attached on an operation panel or the body frame of the printer 1. The external temperature sensor 14 is electrically connected to the controller 9.

(Method of Controlling Inkjet Printer)

FIG. 8 is a diagram illustrating an example of a result of measuring the temperature of the ink in each of the ink flow paths 3*c* to 3*f* stored in the controller 9 illustrated in FIG. 4. FIG. 9 is a diagram illustrating an example of a table stored in the controller 9 illustrated in FIG. 4.

In the present embodiment, when the amount of ink ejected from the plurality of nozzles 3*a* respectively connected to the four ink flow paths 3*c* to 3*f* varies among the ink flow paths 3*c* to 3*f* (that is, when the ink consumption amount varies among the ink flow paths 3*c* to 3*f*), the flow rate of flowing-in ink varies among the four ink flow paths 3*c* to 3*f*. Thus, the time required for the passage of ink through the heating mechanism ink flow paths 20*c* to 20*f* varies among the heating mechanism ink flow paths 20*c* to 20*f*, meaning that the temperature of flowing-in ink varies among the four ink flow paths 3*c* to 3*f*. As a result, the temperature of ink may vary among the four ink flow paths 3*c* to 3*f*.

Even when the flow rate of the flowing-in ink does not vary among the four ink flow paths 3*c* to 3*f*, the level of heating of the ink by the ink heating mechanism 12 may vary among the heating mechanism ink flow paths 20*c* to 20*f*, due to variation in the length and the average value of the cross-sectional areas of the heating mechanism ink flow paths 20*c* to 20*f* among the heating mechanism ink flow paths 20*c* to 20*f* and to the variation in distance between each of the heating mechanism ink flow paths 20*c* to 20*f* and the head-external heater 21 among the heating mechanism ink flow paths 20*c* to 20*f*. Thus, the temperature of the flowing-in may varies among the four ink flow paths 3*c* to 3*f*. As a result, the ink temperature may vary among the four ink flow paths 3*c* to 3*f*.

Even when the temperature of the flowing-in ink does not vary among the four ink flow paths 3*c* to 3*f*, the ink temperature may vary among the four ink flow paths 3*c* to 3*f*, due to the variation in the level of heating of the ink in the ink flow paths 3*c* to 3*f* by the in-head heater 18 among the ink flow paths 3*c* to 3*f*.

According to the studies conducted by the inventors of the present application, when the ink heating mechanism 12 cannot sufficiently heat the ink because the external temperature of the printer 1 is low, or because the flow rate of ink flowing into the ink flow paths 3*c* to 3*f* is high (the passage time of the ink passing through the heating mechanism ink flow paths 20*c* to 20*f* is short), the ink temperature is likely to vary among the four ink flow paths 3*c* to 3*f*. When the ink temperature varies among the four ink flow paths 3*c* to 3*f*, the ink viscosity varies among the four ink flow paths 3*c* to 3*f*.

In view of this, in the present embodiment, the variation in the amount and the speed of ink ejected from the plurality of nozzles 3*a* among the four ink flow paths 3*c* to 3*f* is suppressed, even when the ink viscosity varies among the ink flow paths 3*c* to 3*f*. This is done by the controller 9 estimating the ink temperature in each of the four ink flow paths 3*c* to 3*f*, and controlling the drive voltage applied to the plurality of piezoelectric elements 16 based on the result of the estimation, when the printer 1 performs printing on the print medium 2. The estimation is performed based on the ink flow rate and the external temperature of the printer 1 detected by the external temperature sensor 14. The ink flow rate is a flow rate of the ink flowing into each of the four ink flow paths 3*c* to 3*f* (the flow rate of the ink flowing into the four ink flow paths 3*c* to 3*f* from the ink heating mechanism 12 per unit time). Specifically, the controller 9 controls the drive voltage applied to the plurality of piezoelectric elements 16 as follows.

In the present embodiment, the external temperature detected by the external temperature sensor 14 is defined as first temperature that is the temperature outside the head 3. Thus, the controller 9 treats the external temperature detected by the external temperature sensor 14 as the first temperature. In the following, the piezoelectric elements 16 that make the ink ejected from the plurality of nozzles 3*a* connected to the ink flow path 3*c*, the piezoelectric elements 16 that make the ink ejected from the plurality of nozzles 3*a* connected to the ink flow path 3*d*, the piezoelectric elements 16 that make the ink ejected from the plurality of nozzles 3*a* connected to the ink flow path 3*e*, and the piezoelectric elements 16 that make the ink ejected from the plurality of nozzles 3*a* connected to the ink flow path 3*f* may be distinguished from each other. In such a case, each of the plurality of piezoelectric elements 16 that make the ink ejected from the plurality of nozzles 3*a* connected to the ink flow path 3*c* is referred to as "piezoelectric element 16*c*", each of the plurality of piezoelectric elements 16 that make the ink ejected from the plurality of nozzles 3*a* connected to the ink flow path 3*d* is referred to as "piezoelectric element 16*d*", each of the plurality of piezoelectric elements 16 that make the ink ejected from the plurality of nozzles 3*a* connected to the ink flow path 3*e* is referred to as "piezoelectric element 16*e*", and each of the plurality of piezoelectric elements 16 that make the ink ejected from the plurality of nozzles 3*a* connected to the ink flow path 3*f* is referred to as "piezoelectric element 16*f*".

In the present embodiment, the controller 9 can control the piezoelectric elements 16*c*, the piezoelectric elements 16*d*, the piezoelectric elements 16*e*, and the piezoelectric elements 16*f* individually. On the other hand, the controller 9 cannot individually control each of the plurality of piezoelectric elements 16*c*. In other words, the same drive voltage is applied to the plurality of piezoelectric elements 16*c*. Similarly, the same drive voltage is applied to the plurality of piezoelectric elements 16*d*, the same drive voltage is applied to the plurality of piezoelectric elements 16*e*, and the same drive voltage is applied to the plurality of piezoelectric elements 16*f*. Thus, the controller 9 applies the same drive voltage to the plurality of piezoelectric elements 16 that make the ink ejected from the nozzles 3*a* connected to the same one of the ink flow paths 3*c* to 3*f*.

The ink temperature in each of the four ink flow paths 3*c* to 3*f* is measured in advance in accordance with various values of the ink flow rate and the external temperature of the printer 1, and the result of the measurement is stored in the controller 9 in advance, that is, before the printing on the print medium 2. Specifically, the ink temperature in each of the four ink flow paths 3*c* to 3*f* is measured in accordance with a target heating temperature (a target value of the ink heating temperature) of the ink heated by the in-head heater 18, as well as with various values of the ink flow rate and the external temperature. The result of this measurement is stored in the controller 9 in advance. In the present embodiment, the optimum temperature and the target heating temperature of the ink ejected from the head 3 are both 45° C.

For example, as illustrated in FIG. 8, temperatures T11, T12, T13, . . . , of the ink in the ink flow path 3*c*, temperatures T21, T22, T23, . . . , of the ink in the ink flow path 3*d*, temperatures T31, T32, T33, . . . , of the ink in the ink flow path 3*e*, temperatures T41, T42, T43, . . . , of the ink in the ink flow path 3*f*, when the external temperature is T1 and the ink flow rate in the ink flow paths 3*c* to 3*f* are Q1, Q2, Q3, . . . are measured in advance before the printing on the print medium 2. Similarly, the temperature of the ink in each of the four ink flow paths 3*c* to 3*f* when the external temperature is T2 and the ink flow rate of the ink flow paths 3*c* to 3*f* is Q1, Q2, Q3, . . . , the temperature of the ink in each of the four ink flow paths 3*c* to 3*f* when the external temperature is T3 and the ink flow rate is Q1, Q2, Q3, . . . and the like are measured in advance before the printing on the print medium 2. These measurement results are stored in advance in the controller 9 in a form of a table.

The temperature of ink in each of the four ink flow paths 3*c* to 3*f* in accordance with various values of the ink flow rate and the external temperatures are measured, with the in-head heater 18 and the head-external heater 21 controlled to set the temperature of the ink in at least one of the ink flow paths 3*c* to 3*f* to be 45° C. which is the target heating temperature and to set the temperature of the ink in all of the four ink flow paths 3*c* to 3*f* to be 45° C. or lower for the same ink flow rate and the same external temperature for example.

For example, when the temperature of the ink in each of the four ink flow paths 3*c* to 3*f* is measured, the in-head heater 18 and the head-external heater 21 are controlled to set at least one of the temperature T11 of the in the ink flow path 3*c*, the temperature T21 of the ink in the ink flow path 3*d*, the temperature T31 of the ink in the ink flow path 3*e*, and the temperature T41 of the ink in the ink flow path 3*f* to be 45° C., and to set all of T11, T21, T31, and T41 to be not higher than 45° C., under conditions that the external temperature is T1 and the ink flow rate in the ink flow paths 3*c* to 3*f* is Q1.

When the printing is performed on the print medium 2, print data for performing the printing on the print medium 2 is input to the controller 9 from the upper level apparatus 10. The controller 9 determines the ink flow rate in each of the four ink flow paths 3*c* to 3*f*, based on the print data input to the controller 9. For example, the controller 9 performs predetermined calculation based on the print data input to the controller 9, to calculate the ink flow rate in each of the four ink flow paths 3*c* to 3*f*.

The controller 9 estimates the ink temperature in each of the four ink flow paths 3*c* to 3*f*, based on the ink flow rate determined, the external temperature of the printer 1 detected by the external temperature sensor 14, and the measurement result stored in the controller 9. Specifically, the controller 9 estimates the ink temperature in each of the four ink flow paths 3*c* to 3*f*, by referring to the table stored in the controller 9 (table illustrated in FIG. 8), based on the ink flow rate determined and the external temperature detected by the external temperature sensor 14.

The controller 9 stores in advance a table (refer to FIG. 9) in which the drive voltage for the piezoelectric element 16 and the ink temperature are associated with each other, and refers to the table based on the result of the estimation by the controller 9, to control the drive voltage applied to the plurality of piezoelectric elements 16. In the table illustrated in FIG. 9, the drive voltage for the piezoelectric element 16 is set for each ink temperature, to maintain constant amount and speed of the ink ejected from the nozzle 3*a*, regardless of the ink temperature.

For example, when the external temperature detected by the external temperature sensor 14 is T1, the ink flow rate in the ink flow path 3*c* is determined to be Q1, the ink flow rate in the ink flow path 3*d* is determined to be Q2, the ink flow rate in the ink flow path 3*e* is determined to be Q3, and the ink flow rate in the ink flow path 3*f* is determined to be Q1, the controller 9 estimates the ink temperature in the ink flow path 3*c* to be T11, estimates the ink temperature in the ink flow path 3*d* to be T22, estimates the ink temperature in the ink flow path 3*e* to be T33, and estimates the ink temperature in the ink flow path 3*f* to be T41.

For example, when T11, T22, T33, and T41 are estimated to be 42° C., 44° C., 45° C., and 43° C. respectively, the controller 9 applies the drive voltage of V1+0.828 (V) associated with 42° C. to the piezoelectric element 16*c*, applies the drive voltage of V1+0.276 (V) associated with 44° C. to the piezoelectric element 16*d*, applies the drive voltage of V1 (V) associated with 45° C. to the piezoelectric element 16*e*, and applies the drive voltage of V1+0.552 (V) associated with 43° C. to the piezoelectric element 16*f*.

Each time printing is performed on one print medium 2, the controller 9 estimates the ink temperature in each of the four ink flow paths 3*c* to 3*f* based on the ink flow rate and the external temperature, and updates and sets the drive voltage applied to the plurality of piezoelectric elements 16 based on the result of the estimation. Alternatively, each time one scanning operation is performed in the main scanning direction of the carriage 4 during the printing on the print medium 2, the controller 9 estimates the ink temperature in each of the four ink flow paths 3*c* to 3*f* based on the ink flow rate and the external temperature, and updates and sets the drive voltage applied to the plurality of piezoelectric elements 16 based on the result of the estimation.

Alternatively, the controller 9 estimates the ink temperature in each of the four ink flow paths 3*c* to 3*f* based on the ink flow rate and the external temperature, and updates and sets the drive voltage applied to the plurality of piezoelectric elements 16 based on the result of the estimation in real time. Thus, even while the scanning operation is being performed in the main scanning direction of the carriage 4 during the printing on the print medium 2, the controller 9 estimates the ink temperature in each of the four ink flow paths 3*c* to 3*f* based on the ink flow rate and the external temperature, and updates and sets the drive voltage applied to the plurality of piezoelectric elements 16 based on the result of the estimation.

Main Effects of Present Embodiment

As described above, in the present embodiment, the controller 9 estimates the ink temperature in each of the four ink flow paths 3*c* to 3*f* based on the flow rate of ink flowing into each of the four ink flow paths 3*c* to 3*f* and the external temperature of the printer 1, and controls the drive voltage applied to the plurality of piezoelectric elements 16 based on the result of the estimation. Thus, in the present embodiment, even when the viscosity of ink ejected from the plurality of nozzles 3*a* varies among the ink flow paths 3*c* to 3*f* due to a variation in the ink temperature in the four ink flow paths 3*c* to 3*f* among the ink flow paths 3*c* to 3*f* caused by a variation in the flow rate of ink flowing into each of the four ink flow paths 3*c* to 3*f* and the like, the drive voltage applied to each of a plurality of piezoelectric elements 16 is controlled based on the estimation result for the ink temperature in each of the four ink flow paths 3*c* to 3*f*, to suppress a variation in the amount and the speed of the ink ejected from the plurality of nozzles 3*a* among the ink flow paths 3*c* to 3*f*. Thus, with the present embodiment, the deterioration of the print quality is suppressed, regardless of the conditions for the printing.

In particular, in the present embodiment, the ink temperature in the four ink flow paths 3*c* to 3*f* is likely to vary among the ink flow paths 3*c* to 3*f*, due to the variation in the length and the average value of the cross-sectional areas of the heating mechanism ink flow paths 20*c* to 20*f* among the heating mechanism ink flow paths 20*c* to 20*f*, the variation in the distance between each of the heating mechanism ink flow paths 20*c* to 20*f* and the head-external heater 21 among the heating mechanism ink flow paths 20*c* to 20*f*, and the variation in the level of heating of the ink in the ink flow paths 3*c* to 3*f* by the in-head heater 18 among the ink flow paths 3*c* to 3*f*. Still, with the present embodiment, even when the ink temperature in the four ink flow paths 3*c* to 3*f* is likely to vary among the ink flow paths 3*c* to 3*f*, the drive voltage applied to the plurality of piezoelectric elements 16 is controlled to suppress the variation in the amount and the speed of the ink ejected from the plurality of nozzles 3*a* among the ink flow paths 3*c* to 3*f*.

In the present embodiment, the controller 9 determines the ink flow rate in each of the four ink flow paths 3*c* to 3*f*, based on the print data input to the controller 9. Thus, with the present embodiment, the ink flow rate in each of the four ink flow paths 3*c* to 3*f* can be obtained relatively easily, with the mechanical configuration of the printer 1 simplified.

In the present embodiment, the ink temperature in each of the four ink flow paths 3*c* to 3*f* is measured in advance in accordance with various values of the ink flow rate and the external temperature of the printer 1, and the result of the measurement is stored in the controller 9 in advance. In the present embodiment, the controller 9 estimates the ink temperature in each of the four ink flow paths 3*c* to 3*f*, based on the ink flow rate determined, the external temperature of the printer 1 detected by the external temperature sensor 14, and the measurement result stored in the controller 9. Thus, in the present embodiment, the processing executed by the controller 9 to estimate the ink temperature in each of the four ink flow paths 3*c* to 3*f* is simplified.

(Modification of Method of Controlling Inkjet Printer)

In the embodiment described above, the printer 1 may include a plurality of the in-head temperature sensors 13 for detecting the ink temperature in the four ink flow paths 3*c* to 3*f* respectively. For example, as indicated by two-dot chain lines in FIG. 6, the printer 1 may include four in-head temperature sensors 13 arranged in the vicinity of the four respective ink flow paths 3*c* to 3*f*. In this case, for example, the in-head temperature sensors 13 are disposed above the rear end portions of the respective ink flow paths 3*c* to 3*f*. The in-head temperature sensor 13 of this modification is an ink temperature sensor.

In this modification, the controller 9 controls the drive voltage applied to the plurality of piezoelectric elements 16 based on the result of the detection by the four in-head temperature sensors 13. For example, when the temperature of the ink flow path 3*c* detected by the in-head temperature sensor 13 disposed above the ink flow path 3*c* is 42° C., the temperature of the ink flow path 3*d* detected by the in-head temperature sensor 13 disposed above the ink flow path 3*d* is 44° C., the temperature of the ink flow path 3*e* detected by the in-head temperature sensor 13 disposed above the ink flow path 3*e* is 45° C., and the temperature of the ink flow path 3*f* detected by the in-head temperature sensor 13 disposed above the ink flow path 3*f* is 43° C., the controller 9 applies the drive voltage of V1+0.828 (V) to the piezoelectric element 16*c*, applies the drive voltage of V1+0.276 (V) to the piezoelectric element 16*d*, applies the drive voltage of V1 (V) to the piezoelectric element 16*e*, and applies the drive voltage of V1+0.552 (V) to the piezoelectric element 16*f*. In this modification, the controller 9 does not need to determine the ink flow rate for each of the four ink flow paths 3*c* to 3*f*. Furthermore, in this modification, the ink temperature in each of the four ink flow paths 3*c* to 3*f* needs not to be measured in advance in accordance with various values of the ink flow rate and the external temperature.

Also in this modification, as in the embodiment described above, even when the viscosity of ink ejected from the plurality of nozzles 3*a* varies among the ink flow paths 3*c* to 3*f* due to a variation in the ink temperature in the four ink flow paths 3*c* to 3*f* among the ink flow paths 3*c* to 3*f* caused by a variation in the flow rate of ink flowing into each of the four ink flow paths 3*c* to 3*f* and the like, the drive voltage applied to each of a plurality of piezoelectric elements 16 can be controlled based on the result of the detection by the four in-head temperature sensors 13, to suppress a variation in the amount and the speed of the ink ejected from the plurality of nozzles 3*a* among the ink flow paths 3*c* to 3*f*. Thus, also with the modification, the deterioration of the print quality can be suppressed regardless of the conditions for the printing. Furthermore, in this modification, since the in-head temperature sensors 13 are arranged in the vicinity of the four respective ink flow paths 3*c* to 3*f*, the ink temperature in each of the four ink flow paths 3*c* to 3*f* can be accurately detected by the in-head temperature sensors 13.

In this modification, the in-head temperature sensor 13 may be disposed in each of the four ink flow paths 3*c* to 3*f*. Also in this case, the ink temperature in each of the four ink flow paths 3*c* to 3*f* can be accurately detected with the in-head temperature sensor 13. The four ink temperature sensors for detecting the ink temperature in each of the four ink flow paths 3*c* to 3*f* can be disposed outside the head 3, as long as the ink temperature in each of the four ink flow paths 3*c* to 3*f* can be appropriately detected in this modification. For example, the ink temperature sensor may be disposed in the vicinity of the ink outflow port of each of the heating mechanism ink flow paths 20*c* to 20*f*.

As in this modification, when the in-head temperature sensor 13 is disposed in the vicinity of each of the four ink flow paths 3*c* to 3*f*, one in-head heater 18 may be disposed at each of positions where the four ink flow paths 3*c* to 3*f* are formed, and the four in-head heaters 18 may be individually controlled based on the results of the detection by the four in-head temperature sensors 13 to suppress the variation in the ink temperature among the four ink flow paths 3*c* to 3*f*. Still, according to the studies conducted by the inventors of the present application, even when the four in-head heaters 18 are individually controlled based on the results of the detection by the four in-head temperature sensors 13, since a change in the temperature of the in-head heaters 18 does not immediately lead to a change in the ink temperature in the ink flow paths 3*c* to 3*f*, the variation in the ink temperature among the four ink flow paths 3*c* to 3*f* is difficult to suppress.

Other Embodiments

The embodiment and the modification described above are examples of a preferred embodiment of the present invention. The present invention is not limited to these, and can be modified in various ways without changing the gist of the present invention.

In the embodiments described above, the printer 1 may include four flowmeters for detecting the flow rate of ink flowing into the four respective ink flow paths 3*c* to 3*f*. In this case, the flowmeter is provided to each of the four ink flow paths 3*c* to 3*f*, and the controller 9 determines the flow rate of the ink flowing into each of the four ink flow paths 3*c* to 3*f* based on the results of the detection by the four flowmeters. In the embodiment described above, the ink heating mechanism 12 may include the four flowmeters for detecting the flow rate of the ink flowing into the respect heating mechanism ink flow paths 20*c* to 20*f*. In this case, the flowmeter is provided to each of the four ink flow paths 20*c* to 20*f*, and the controller 9 determines the flow rate of the ink flowing into each of the four ink flow paths 3*c* to 3*f* based on the results of the detection by the four flowmeters.

In the embodiment described above, when the printer 1 performs the printing on the print medium 2, the controller 9 may estimate the ink temperature in each of the four ink flow paths 3*c* to 3*f*, based on the ink flow rate in each of the four ink flow paths 3*c* to 3*f*, and the first temperature that is the external temperature of the head 3 detected by the head-external temperature sensor 22. In this case, before the printing on the print medium 2, the ink temperature in each of the four ink flow paths 3*c* to 3*f* is measured in advance based on the target heating temperature of the ink heated by the in-head heater 18 as well as various values of the ink flow rate and the first temperature (specifically, the first temperature detected by the head-external temperature sensor 22), and the result of the measurement is stored in advance in the controller 9.

In the embodiment described above, when the printer 1 performs the printing on the print medium 2, the controller 9 may estimate the ink temperature in each of the four ink flow paths 3*c* to 3*f*, based on the ink flow rate in each of the four ink flow paths 3*c* to 3*f*, and the first temperature that is the internal temperature of the head 3. For example, the controller 9 may estimate the ink temperature in each of the four ink flow paths 3*c* to 3*f*, based on the ink flow rate in each of the four ink flow paths 3*c* to 3*f*, and the first temperature detected by the in-head temperature sensor 13. In this case, before the printing on the print medium 2, the ink temperature in each of the four ink flow paths 3*c* to 3*f* is measured in accordance with a target heating temperature of the ink heated by the in-head heater 18, as well as with various values of the ink flow rate and the first temperature (specifically, the first temperature detected by the in-head temperature sensor 13). The result of this measurement is stored in the controller 9 in advance.

In the embodiment and the modification described above, the four heating mechanism ink flow paths 20*c* to 20*f* may have the same flow path length. In the embodiment described above, the four heating mechanism ink flow paths 20*c* to 20*f* may have the same average value of the cross-sectional areas. In the embodiment described above, the distances between the four heating mechanism ink flow paths 20*c* to 20*f* and the head-external heater 21 may be the same. In the embodiment described above, the in-head heater 18 may evenly heat the ink in the ink flow paths 3*c* to 3*f*.

Note that when the flow rate of the ink flowing in varies among the four ink flow paths 3*c* to 3*f*, the ink temperature varies among the four ink flow paths 3*c* to 3*f*, even if the four heating mechanism ink flow paths 20*c* to 20*f* have the same flow path length and average value of the cross-sectional areas, the distances between the four heating mechanism ink flow paths 20*c* to 20*f* and the head-external heater 21 are the same, and the in-head heater 18 evenly heats the ink in the ink flow paths 3*c* to 3*f*.

In the embodiment and the modification described above, the number of ink flow paths formed in the head 3 may be two, three, or five or more. In the embodiment and the modification described above, the controller 9 may be able to individually control the plurality of piezoelectric elements 16. In the embodiment and the modification described above, the head 3 may not include the in-head heater 18. In the embodiment and the modification described above, the printer 1 may not include the ink heating mechanism 12.

In the embodiment and the modification described above, the ejection energy generation element for making the nozzles 3*a* eject the ink is the piezoelectric element 16. Alternatively, the ejection energy generation element for making the nozzles 3*a* eject the ink may be a heater (heat emitting element). In other words, the printer 1 makes the nozzles 3*a* eject ink by a piezoelectric mechanism in the embodiment and the modification described above, but the printer 1 may make the ink ejected from the nozzle 3*a* by a thermal mechanism.

In the embodiment and the modification described above, the ink used in the printer 1 may be ink other than the UV ink, having viscosity that is high at a normal temperature and largely varies due to temperature change, or may be ink that does not have such characteristics. In the embodiment and the modification described above, the printer 1 may include, in place of the platen 8, a table on which the print medium 2 is placed, and a table drive mechanism that moves the table in the front-rear direction. In the embodiment and the modification described above, the printer 1 may be a 3D printer that produces a three-dimensional object.

[Second Invention Group]

Hereinafter, an embodiment of the present invention will be described with reference to the drawings. In the description below, some of the drawings used in the embodiment and the modification described above will be used. Still, the inkjet printer according to the present embodiment is a printer apparatus that is different from the inkjet printer according to the embodiment described above and the like.

(Configuration of Inkjet Printer)

Figure 11:
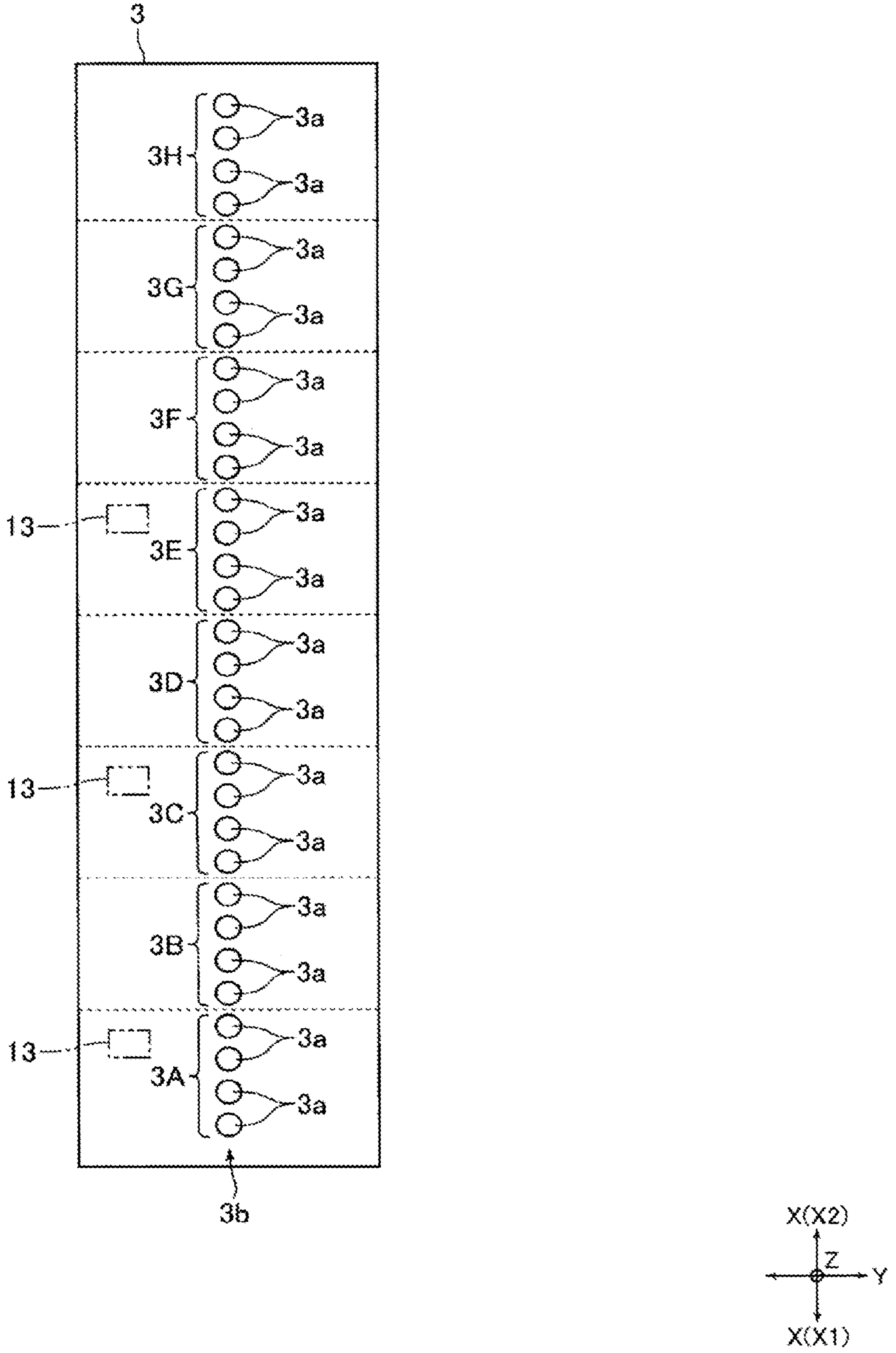
FIG. 11 is a bottom view illustrating a schematic configuration of the inkjet head illustrated in FIG. 2.
Figure 14:
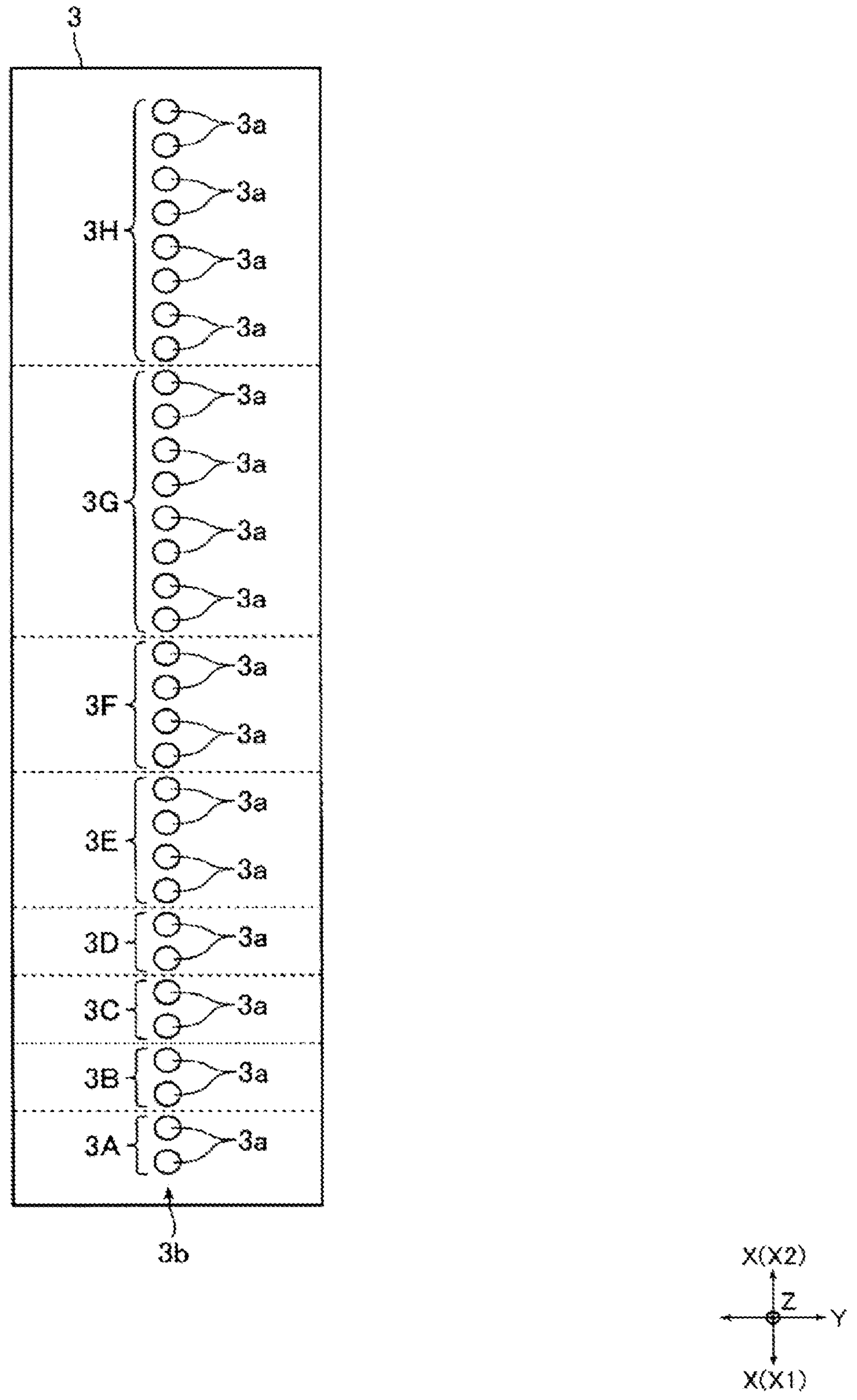
FIG. 14 is a bottom view illustrating a schematic configuration of an inkjet head according to another embodiment of the present invention.

FIG. 1 is a perspective view of an inkjet printer 1 according to an embodiment of the present invention. FIG. 2 is a schematic view illustrating a configuration of the inkjet printer 1 illustrated in FIG. 1. FIG. 3 is a perspective view of part of a peripheral portion of a carriage 4 illustrated in FIG. 2. FIG. 4 is a block diagram illustrating a configuration of the inkjet printer 1 illustrated in FIG. 1. FIG. 14 is a cross-sectional view illustrating a schematic configuration of an inkjet head 3 illustrated in FIG. 2. FIG. 11 is a bottom view illustrating a schematic configuration of the inkjet head 3 illustrated in FIG. 2.

An inkjet printer 1 of the present embodiment (hereinafter referred to as "printer 1") is, for example, an inkjet printer for commercial use, and performs printing on a print medium 2 by ejecting ink. The ink used in the printer 1 has a viscosity that is high at normal temperature and largely varies due to temperature change. In the present embodiment, ultraviolet-curable ink (UV ink) is used in the printer 1. The print medium 2 is, for example, a paper sheet, fabric, resin film, or the like for printing.

The printer 1 includes: an inkjet head 3 (hereinafter, referred to as a "head 3") that ejects ink toward the print medium 2; a carriage 4 on which the head 3 is mounted; a carriage drive mechanism 5 that moves the carriage 4 in a main scanning direction (such as a Y direction in FIG. 1 and the like); a guide rail 6 that guides the carriage 4 in the main scanning direction; and a plurality of ink tanks 7 storing ink to be supplied to the head 3. In the following description, the main scanning direction (Y direction) is referred to as a "left-right direction", and a sub scanning direction (an X direction in FIG. 1 and the like) orthogonal to the up-down direction (a Z direction in FIG. 1 and the like) and the main scanning direction is referred to as a "front-rear direction". Furthermore, an X1 direction side in FIG. 1 and the like which is one side in the front-rear direction is referred to as a "front" side, and an X2 direction side in FIG. 1 and the like which is the other side in the front-rear direction is referred to as a "rear" side.

The printer 1 further includes: a pressure adjustment mechanism 11 for adjusting the internal pressure of the head 3; an ink heating mechanism 12 for heating the ink supplied to the head 3; an in-head temperature sensor 13 for detecting the temperature of the ink inside the head 3; and an external temperature sensor 14 for detecting the temperature (external temperature) outside the printer 1. The printer 1 further includes a controller 9 that controls the printer 1. An upper level apparatus 10, such as a personal computer (PC), for the printer 1 is electrically connected to the controller 9.

A plurality of nozzles 3*a* that eject the ink are formed in the lower surface of the head 3. The plurality of nozzles 3*a* are arranged at a constant pitch along the front-rear direction, and the plurality of nozzles 3*a* arranged in the front-rear direction form a nozzle row 3*b*. Thus, the nozzle row 3*b* including the plurality of nozzles 3*a* arranged in a certain direction is formed in the head 3. The front-rear direction (X direction) of the present embodiment is a first direction, which is the direction in which the plurality of nozzles 3*a* forming the nozzle row 3*b* is arranged.

The nozzle row 3*b* includes nozzle groups 3A to 3H each including the plurality of nozzles 3*a* grouped in advance in the front-rear direction. In the present embodiment, for example, all of the nozzles 3*a* forming the nozzle row 3*b* are evenly grouped into eight groups, in the front-rear direction. Specifically, as illustrated in FIG. 11, the nozzle row 3*b* includes the eight nozzle groups 3A to 3*h* each including the same number of nozzles 3*a*. The nozzle groups 3A to 3*h* are arranged in this order from the front end to the rear end of the head 3 in this order.

Further, an ink flow path 3*h* to which a plurality of nozzles 3*a* is connected is formed in the head 3. One end of the ink flow path 3*h* serves as an ink inflow port 3*i* into which the ink flows toward the head 3. The ink inflow port 3*i* is formed on the front end side of the head 3. In the example illustrated in FIG. 11, one nozzle row 3*b* is formed on the lower surface of the head 3, but a plurality of the nozzle rows 3*b* may be formed on the lower surface of the head 3 to be arranged in the left-right direction at an interval.

A platen 8 is disposed below the head 3. The printing medium 2 is placed on the platen 8 when the printing is performed. A medium feeding mechanism (not illustrated) conveys the print medium 2 placed on the platen 8 in the front-rear direction. For example, the carriage drive mechanism 5 includes: two pulleys; a belt that is wound across the two pulleys and is partially fixed to the carriage 4; and a motor that rotates the pulleys. An ultraviolet irradiator (not illustrated) is mounted on the carriage 4 and irradiates the ink ejected from the head 3 with ultraviolet light to cure the ink.

The head 3 includes a plurality of piezoelectric elements 16 that make the plurality of respective nozzles 3*a* eject the ink. The head further includes a driver integrated circuit (IC) 17 that applies drive voltage to the piezoelectric elements 16 to drive the piezoelectric elements 16; and an in-head heater 18 that heats the ink inside the head 3. The piezoelectric elements 16, the driver IC 17, and the in-head heater 18 are disposed inside the head 3. The piezoelectric elements 16 are electrically connected to the controller 9. The piezoelectric element 16 according to the present embodiment is an ejection energy generation element. The driver IC 17 may not be disposed in the head 3. In such a case, the driver IC 17 is mounted on a circuit board installed in the carriage 4 for example.

The in-head temperature sensor 13 is disposed inside the head 3. For example, as illustrated in FIG. 14, the in-head temperature sensor 13 is disposed above the rear end portions of the ink flow path 3*h*. The in-head temperature sensor 13 is disposed outside the ink flow path 3*h*. The in-head temperature sensor 13 indirectly detects the temperature of the ink (specifically, the ink in the ink flow path 3*h*) inside the head 3 by detecting the temperature of a body frame of the head 3. The in-head temperature sensor 13 is electrically connected to the controller 9. The in-head temperature sensor 13 may be disposed at a position to be in contact with the ink in the ink flow path 3*h*, to directly detect the temperature of the ink in the ink flow path 3*h*.

The in-head heater 18 functions to reduce the viscosity of the ink inside the head 3, by heating the body frame of the head 3 to thus heat the ink (specifically, the ink in the ink flow path 3*h*) inside the head 3. The in-head heater 18 is disposed above the ink flow path 3*h*. The in-head heater 18 is disposed at the center part of the interior the head 3. The in-head heater 18 is electrically connected to the controller 9.

The controller 9 controls the in-head heater 18 based on the result of the detection by the in-head temperature sensor 13. Specifically, when the in-head temperature sensor 13 detects a temperature that is lower than a predetermined set temperature, the controller 9 drives the in-head heater 18 and stops the in-head heater 18 once the temperature detected by the in-head temperature sensor 13 reaches or exceeds the set temperature. The in-head heater 18 includes a temperature sensor (not illustrated) for detecting an overheating state of the in-head heater 18. The temperature sensor is a thermistor for example that is attached to the in-head heater 18.

The ink is supplied from the ink tank 7 to the pressure adjustment mechanism 11. Specifically, the ink tank 7 is disposed above the pressure adjustment mechanism 11, and the ink is supplied from the ink tank 7 to the pressure adjustment mechanism 11 by means of the head difference. The ink heating mechanism 12 is disposed between the pressure adjustment mechanism 11 and the head 3, in the ink supply path to the head 3. The ink is supplied to the ink heating mechanism 12 from the pressure adjustment mechanism 11, and is supplied to the head 3 from the ink heating mechanism 12. The pressure adjustment mechanism 11 and the ink heating mechanism 12 are mounted on the carriage 4.

The ink heating mechanism 12 is a head-external ink heating device disposed outside the head 3. The ink heating mechanism 12 functions to lower the viscosity of the ink supplied to the head 3 by heating the ink supplied to the head 3. The ink heating mechanism 12 is disposed above the head 3. The ink heating mechanism 12 includes a heating unit body 20 that is formed in a block shape, a head-external heater 21 attached to the heating unit body 20, and a head-external temperature sensor 22 attached to the heating unit body 20.

An ink flow path in which ink flows is formed in the heating unit body 20. The head-external heater 21 is formed in a sheet shape and thus is a sheet heater. The head-external heater 21 is attached to a side surface of the heating unit body 20. The head-external heater 21 and the head-external temperature sensor 22 are electrically connected to the controller 9. The controller 9 controls the head-external heater 21 based on the result of the detection by the head-external temperature sensor 22.

The pressure adjustment mechanism 11 is attached to the ink heating mechanism 12. The pressure adjustment mechanism 11 has a lower part contained in the heating unit body 20. For example, the pressure adjustment mechanism 11 is a mechanical pressure damper having the same configuration as a pressure adjustment damper described in Japanese Unexamined Patent Publication No. 2011-46070, and mechanically adjusts the internal pressure of the head 3 without using a pressure adjustment pump. The pressure adjustment mechanism 11 adjusts the internal pressure of the head 3 (the internal pressure of the ink flow path 3*h*) to be a negative pressure.

The external temperature sensor 14 is mounted on the carriage 4, for example. Alternatively, the external temperature sensor 14 is attached on an operation panel or the body frame of the printer 1. The external temperature sensor 14 is electrically connected to the controller 9.

(Method of Controlling Inkjet Printer)

Figure 12:
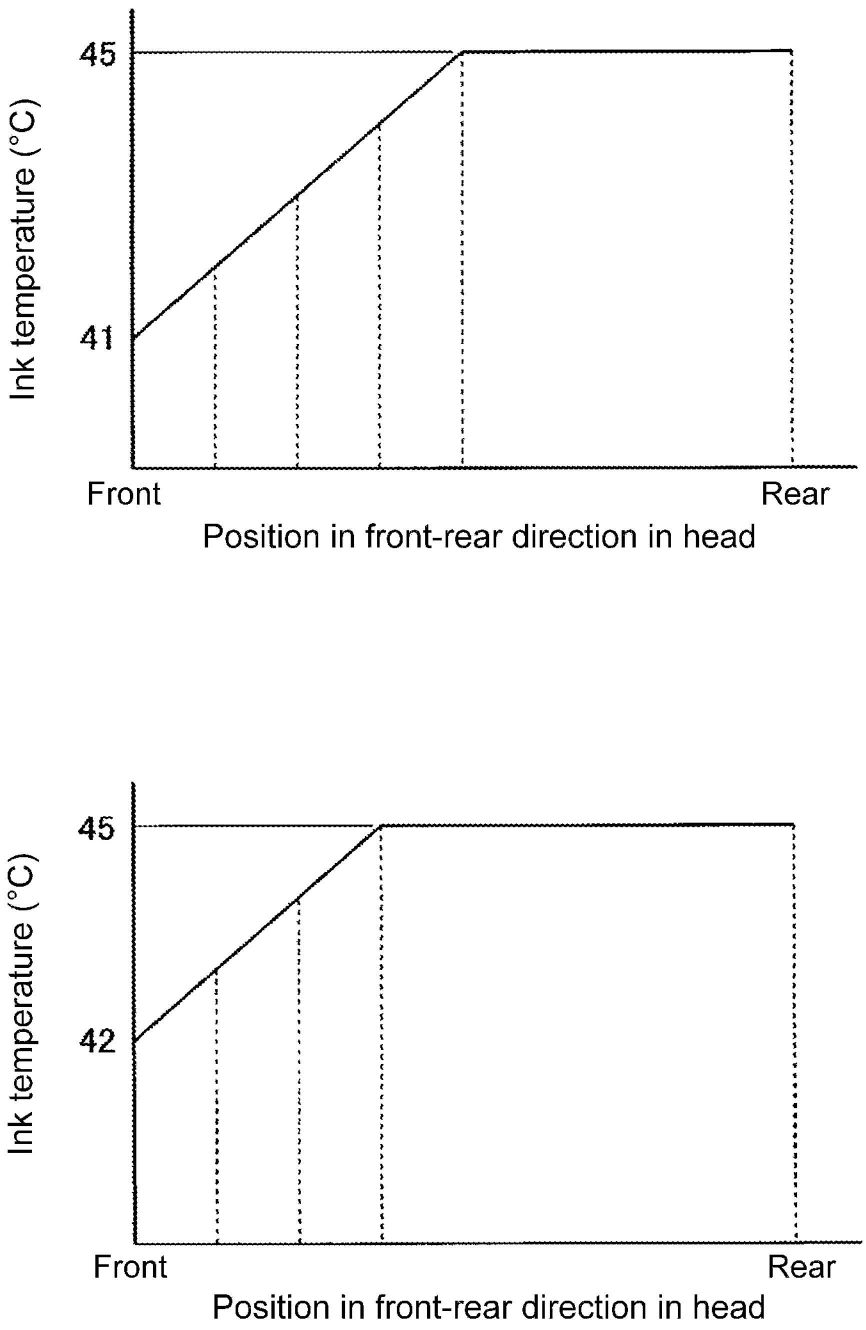
FIG. 12 is a diagram illustrated an example of results of measuring the ink temperature at each position in the front-rear direction in the inkjet head, stored in the controller illustrated in FIG. 4.
Figure 13:
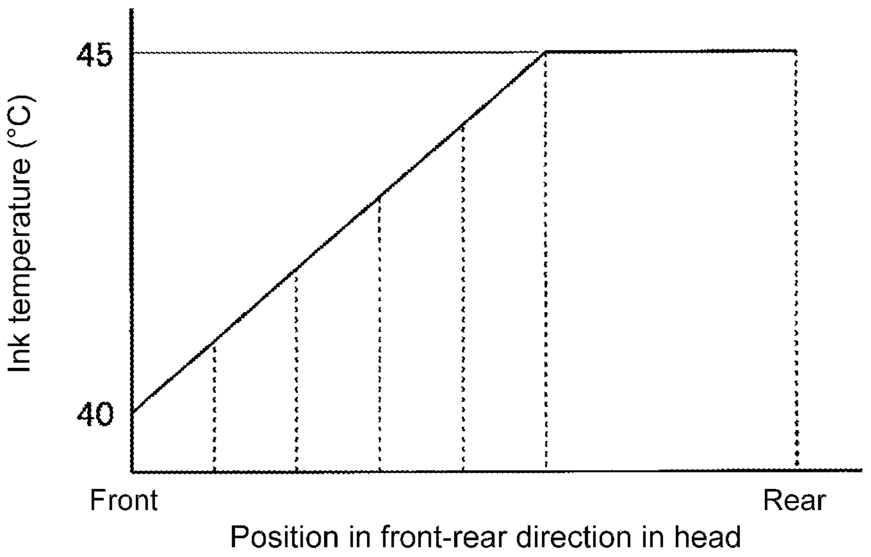
FIG. 13 is a diagram illustrating an example of results of measuring the ink temperature at each position in the front-rear direction in the inkjet head, stored in the controller illustrated in FIG. 4.
Figure 13:
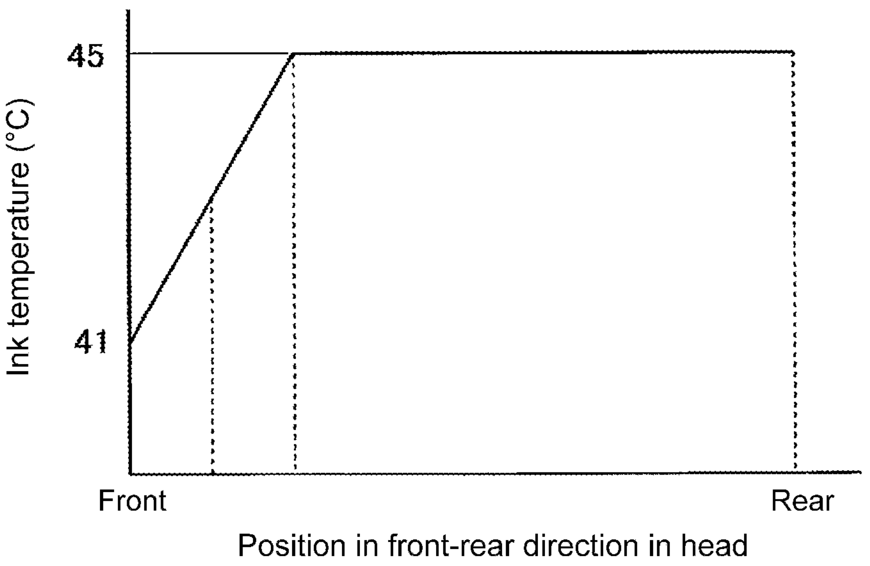

FIG. 12 and FIG. 13 are diagrams illustrating an example of results of measuring the ink temperature at each position in the front-rear direction in the head 3, stored in the controller 9 illustrated in FIG. 4. FIG. 9 is a diagram illustrating an example of a table stored in the controller 9 illustrated in FIG. 4.

When the printer 1 performs printing on the print medium 2, the controller 9 estimates the ink temperature at each position in the front-rear direction in the head 3, based on an ink flow rate that is a flow rate of ink flowing into the head 3 (that is, a flow rate of the ink flowing into the head 3 from the ink heating mechanism 12 per unit time) and an inflowing ink temperature that is a temperature of the ink flowing into the head 3 (that is, the temperature of the ink at the ink inflow port 3*i*), and controls the drive voltage applied to the plurality of piezoelectric elements 16 based on the result of this estimation. Specifically, the controller 9 controls the drive voltage applied to the plurality of piezoelectric elements 16 as follows.

In the description below, the piezoelectric elements 16 that make the ink ejected from the nozzles 3*a* forming each of the nozzle groups 3A to 3H may be described while being distinguished from each other. In such a case, the plurality of piezoelectric elements 16 that make the nozzles 3*a* forming the nozzle group 3A eject ink are each referred to as "piezoelectric element 16A", the plurality of piezoelectric elements 16 that make the nozzles 3*a* forming the nozzle group 3B eject ink are each referred to as "piezoelectric element 16B", the plurality of piezoelectric elements 16 that make the nozzles 3*a* forming the nozzle group 3C eject ink are each referred to as "piezoelectric element 16C", the plurality of piezoelectric elements 16 that make the nozzles 3*a* forming the nozzle group 3D eject ink are each referred to as "piezoelectric element 16D", the plurality of piezoelectric elements 16 that make the nozzles 3*a* forming the nozzle group 3E eject ink are each referred to as "piezoelectric element 16E", the plurality of piezoelectric elements 16 that make the nozzles 3*a* forming the nozzle group 3F eject ink are each referred to as "piezoelectric element 16F", the plurality of piezoelectric elements 16 that make the nozzles 3*a* forming the nozzle group 3G eject ink are each referred to as "piezoelectric element 16G", and the plurality of piezoelectric elements 16 that make the nozzles 3*a* forming the nozzle group 3H eject ink are each referred to as "piezoelectric element 16H".

In the present embodiment, the controller 9 can control the piezoelectric elements 16A, the piezoelectric elements 16B, the piezoelectric elements 16C, the piezoelectric elements 16D, the piezoelectric elements 16E, the piezoelectric elements 16F, the piezoelectric elements 16G, and the piezoelectric elements 16H individually. On the other hand, the controller 9 cannot individually control each of the plurality of piezoelectric elements 16A. In other words, the same drive voltage is applied to the plurality of piezoelectric elements 16A. Similarly, the same drive voltage is applied to the plurality of piezoelectric elements 16B, the same drive voltage is applied to the plurality of piezoelectric elements 16C, the same drive voltage is applied to the plurality of piezoelectric elements 16D, the same drive voltage is applied to the plurality of piezoelectric elements 16E, the same drive voltage is applied to the plurality of piezoelectric elements 16F, the same drive voltage is applied to the plurality of piezoelectric elements 16G, and the same drive voltage is applied to the plurality of piezoelectric elements 16H. Thus, the controller 9 applies the same drive voltage to the plurality of piezoelectric elements 16 making the nozzles 3*a* belonging to the same group eject ink.

The ink temperature at each position in the front-rear direction in the head 3 is measured in advance in accordance with various values of the ink flow rate and the inflowing ink temperature, and the result of the measurement is stored in the controller 9 in advance, that is, before the printing on the print medium 2. Specifically, the ink temperature at each position in the front-rear direction in the head 3 is measured in accordance with a target heating temperature (a target value of the ink heating temperature) of the ink heated by the in-head heater 18, as well as with various values of the ink flow rate and the inflowing ink temperature. The result of this measurement is stored in the controller 9 in advance. In the present embodiment, the optimum temperature and the target heating temperature of the ink ejected from the head 3 are both 45° C.

For example, the ink temperature at each position in the front-rear direction in the head 3 in a case where the ink flow rate is Q1 and the inflowing ink temperature is 41° C. (refer to (A) of FIG. 12), the ink temperature at each position in the front-rear direction in the head 3 in a case where the ink flow rate is Q1 and the inflowing ink temperature is 42° C. (refer to (B) of FIG. 12), the ink temperature at each position in the front-rear direction in the head 3 in a case where the ink flow rate is Q1 and the inflowing ink temperature is 40° C. (refer to (A) of FIG. 13), the ink temperature at each position in the front-rear direction in the head 3 in a case where the ink flow rate is Q2 lower than Q1 and the inflowing ink temperature is 41° C. (refer to (B) of FIG. 13), and the like are measured, and the result of this measurement is stored in the controller 9 in advance, that is, before the printing on the print medium 2.

When the inflowing ink temperature is lower than 45° C., which is the target heating temperature, the ink inside the head 3 is heated by the in-head heater 18 until the temperature of the ink reaches 45° C. Therefore, when the inflowing ink temperature is lower than 45° C., the ink temperature is the lowest at the front end portion in the head 3. Thus, a lower inflowing ink temperature results in a position where the ink temperature reaches 45° C. being more on the rear side in the head 3. A higher ink flow rate results in a position where the ink temperature reaches 45° C. being more on the rear side in the head 3.

When the printing is performed on the print medium 2, print data for performing the printing on the print medium 2 is input to the controller 9 from the upper level apparatus 10. The controller 9 determines the ink flow rate, based on the print data input to the controller 9. For example, the controller 9 performs predetermined calculation based on the print data input to the controller 9, to calculate the ink flow rate.

The controller 9 determines the inflowing ink temperature based on the ink flow rate determined and the external temperature of the printer 1 detected by the external temperature sensor 14. For example, the controller 9 stores a table in which the ink flow rate, the external temperature of the printer 1, and the inflowing ink temperature are associated with each other in advance, and the controller 9 determines the inflowing ink temperature with reference to this table. Alternatively, the controller 9 calculates the inflowing ink temperature by performing a predetermined calculation based on the ink flow rate determined and the external temperature of the printer 1 detected by the external temperature sensor 14. The controller 9 calculating the inflowing ink temperature by performing the predetermined calculation takes into account the performance of the ink heating mechanism 12 and the like.

Thereafter, the controller 9 estimates the temperature of the ink at each position in the front-rear direction in the head 3 based on the determined ink flow rate and inflowing ink temperature and the measurement result stored in the controller 9. The controller 9 stores in advance a table (refer to FIG. 9) in which the drive voltage for the piezoelectric element 16 and the ink temperature are associated with each other, and refers to the table based on the result of the estimation by the controller 9, to control the drive voltage applied to the plurality of piezoelectric elements 16. In the table illustrated in FIG. 9, the drive voltage for the piezoelectric element 16 is set for each ink temperature, to maintain constant amount and speed of the ink ejected from the nozzle 3*a*, regardless of the ink temperature.

For example, when the ink flow rate is determined to be Q1 and the inflowing ink temperature is determined to be 41° C. (refer to (A) of FIG. 12), the ink temperature at the boundary position between the nozzle group 3A and the nozzle group 3B is estimated to be 42° C., the ink temperature at the boundary position between the nozzle group 3B and the nozzle group 3C is estimated to be 43° C., the ink temperature at the boundary position between the nozzle group 3C and the nozzle group 3D is estimated to be 44° C., and the ink temperature at a part more on the rear side than the boundary position between the nozzle group 3D and the nozzle group 3E is estimated to be 45° C.

Thus, in this case, the controller 9 applies the drive voltage of V1+1.104 (V) associated with 41° C. to the piezoelectric element 16A, applies the drive voltage of V1+0.828 (V) associated with 42° C. to the piezoelectric element 16B, the drive voltage of V1+0.552 (V) associated with 43° C. to the piezoelectric element 16C, the drive voltage of V1+0.276 (V) associated with 44° C. to the piezoelectric element 16D, and applies the drive voltage of V1 (V) associated with 45° C. to the piezoelectric elements 16E to 16H, for example. A lower ink temperature leads to a lower ink viscosity, resulting in the ink being more difficult to be ejected from the nozzle 3*a*. Thus, as illustrated in FIG. 9, for a lower ink temperature, the drive voltage applied to the piezoelectric element 16 is set to be higher.

For example, when the ink flow rate is determined to be Q1 and the inflowing ink temperature is determined to be 42° C. (refer to (B) of FIG. 12), the controller 9 applies the drive voltage of V1+0.828 (V) associated with 42° C. to the piezoelectric element 16A, the drive voltage of V1+0.552 (V) associated with 43° C. to the piezoelectric element 16B, the drive voltage of V1+0.276 (V) associated with 44° C. to the piezoelectric element 16C, and applies the drive voltage of V1 (V) associated with 45° C. to the piezoelectric elements 16D to 16H, for example.

Similarly, for example, when the ink flow rate is determined to be Q1 and the inflowing ink temperature is determined to be 40° C. (refer to (A) of FIG. 13), the controller 9 applies the drive voltage of V1+1.380 (V) to the piezoelectric element 16A, applies the drive voltage of V1+1.104 (V) to the piezoelectric element 16B, applies the drive voltage V1+0.828 (V) to the piezoelectric element 16C, applies the drive voltage V1+0.552 (V) to the piezoelectric element 16D, applies the drive voltage V1+0.276 (V) to the piezoelectric element 16E, and applies the drive voltage V1 (V) to the piezoelectric elements 16F to 16H.

For example, when the ink flow rate is determined to be Q2 and the inflowing ink temperature is determined to be 41° C. (refer to (B) of FIG. 13), the controller 9 applies the drive voltage of V1+1.104 (V) to the piezoelectric element 16A, applies the drive voltage of V1+0.552 (V) to the piezoelectric element 16B, and applies the drive voltage V1 (V) to the piezoelectric elements 16C to 16H.

In this manner, when the inflowing ink temperature is lower than 45° C., the ink temperature on the front end side in the head 3 is lower than the ink temperature on the rear end side in the head 3, and thus the controller 9 sets the drive voltage applied to the piezoelectric element 16 that makes the nozzle 3*a* disposed on the front end side of the head 3 eject the ink, to be higher than the drive voltage applied to the piezoelectric element 16 that makes the nozzle 3*a* disposed on the rear end side of the head 3 eject the ink. In other words, the controller 9 sets the drive voltage to the piezoelectric elements 16A that make the nozzles 3*a* forming the nozzle group 3A eject ink, to be higher than the drive voltage to the piezoelectric elements 16H that make the nozzles 3*a* forming the nozzle group 3H eject ink.

Each time printing is performed on one print medium 2, the controller 9 estimates the ink temperature at each position in the front-rear direction in the head 3, based on the ink flow rate and the inflowing ink temperature, and updates and sets the drive voltage applied to the plurality of piezoelectric elements 16 based on the result of the estimation. Alternatively, each time one scanning operation is performed in the main scanning direction of the carriage 4 during the printing on the print medium 2, the controller 9 estimates the ink temperature at each position in the front-rear direction in the head 3 based on the ink flow rate and the inflowing ink temperature, and updates and sets the drive voltage applied to the plurality of piezoelectric elements 16 based on the result of the estimation.

Alternatively, the controller 9 estimates the ink temperature at each position in the front-rear direction in the head 3 based on the ink flow rate and the inflowing ink temperature, and updates and sets the drive voltage applied to the plurality of piezoelectric elements 16 based on the result of the estimation in real time. Specifically, even when the scanning operation is being performed in the main scanning direction by the carriage 4 during the printing on the print medium 2, the controller 9 estimates the ink temperature at each position in the front-rear direction in the head 3 based on the ink flow rate and the inflowing ink temperature, and updates and sets the drive voltage applied to the plurality of piezoelectric elements 16 based on the result of the estimation.

Main Effects of Present Embodiment

As described above, in the present embodiment, the controller 9 estimates the ink temperature at each position in the front-rear direction in the head 3 based on the ink flow rate and the inflowing ink temperature, and controls the drive voltage applied to the plurality of piezoelectric elements 16 based on the result of the estimation. Thus, in the present embodiment, even when the ink temperature in the head 3 varies along the front-rear direction to result in a variation in the viscosity of the ink ejected from the plurality of nozzles 3*a* along the front-rear direction, the drive voltage applied to the plurality of piezoelectric elements 16 can be controlled to suppress the variation, along the front-rear direction, in the amount and the speed of the ink ejected from the plurality of nozzles 3*a*, based on the result of the estimation of the ink temperature at each position in the front-rear direction in the head 3. Thus, with the present embodiment, the deterioration of the print quality is suppressed, regardless of the conditions for the printing.

In the present embodiment, the controller 9 determines the ink flow rate based on the print data input to the controller 9, and determines the inflowing ink temperature based on the ink flow rate determined and the external temperature detected by the external temperature sensor 14. Thus, with the present embodiment, the ink flow rate and the inflowing ink temperature can be obtained relatively easily, with the mechanical configuration of the printer 1 simplified.

In the present embodiment, the ink temperature at each position in the front-rear direction in the head 3 is measured in advance in accordance with various values of the ink flow rate and the inflowing ink temperature, and the result of the measurement is stored in the controller 9 in advance. Furthermore, in the present embodiment, the controller 9 estimates the temperature of the ink at each position in the front-rear direction inside the head 3 based on the determined ink flow rate and inflowing ink temperature and the measurement result stored in the controller 9. Thus, in the present embodiment, the processing executed by the controller 9 to estimate the ink temperature at each position in the front-rear direction in the head 3 is simplified.

In the present embodiment, when the inflowing ink temperature is lower than 45° C., the ink temperature on the front end side in the head 3 is lower than the ink temperature on the rear end side in the head 3. In this case, the controller 9 sets the drive voltage applied to the piezoelectric element 16 that makes the nozzle 3*a* disposed on the front end side of the head 3 eject the ink, to be higher than the drive voltage applied to the piezoelectric element 16 that makes the nozzle 3*a* disposed on the rear end side of the head 3 eject the ink. Thus, in the present embodiment, the variation, along the front-rear direction, in the amount and the speed of the ink ejected from the plurality of nozzles 3*a* is suppressed, even when the ink temperature on the front end side in the head 3 is low.

(Modification of Method of Controlling Inkjet Printer)

In the embodiment described above, the printer 1 may include a plurality of the in-head temperature sensors 13. For example, as indicated by two-dot chain lines in FIG. 11, the printer 1 may include three in-head temperature sensors 13. In this case, the three in-head temperature sensors 13 are arranged at an interval in the front-rear direction. For example, in the front-rear direction, the in-head temperature sensors 13 are arranged at three positions that are a position where the nozzle group 3A is disposed, a position where the nozzle group 3C is disposed, and a position where the nozzle group 3E is disposed.

In this case, the controller 9 controls the drive voltage applied to the plurality of piezoelectric elements 16 based on the result of the detection by the three in-head temperature sensors 13. As described above, the controller 9 estimates the ink temperature at each position in the front-rear direction in the head 3 based on the result of the detection by the three in-head temperature sensors 13, and controls the drive voltage applied to the plurality of piezoelectric elements 16 based on the result of the estimation.

Also in this modification, as in the embodiment described above, even when the ink temperature in the head 3 varies along the front-rear direction to result in a variation in the viscosity of the ink ejected from the plurality of nozzles 3*a* along the front-rear direction, the drive voltage applied to the plurality of piezoelectric elements 16 can be controlled to suppress the variation, along the front-rear direction, in the amount and the speed of the ink ejected from the plurality of nozzles 3*a*, based on the result of detection by the three in-head temperature sensors 13. Thus, also with the modification, the deterioration of the print quality can be suppressed regardless of the conditions for the printing. In this modification, the controller 9 does not need to determine the ink flow rate and the inflowing ink temperature. Furthermore, in this modification, the ink temperature at each position in the front-rear direction in the head 3 needs not to be measured in advance in accordance with various values of the ink flow rate and inflowing ink temperature.

In this modification, the number of in-head temperature sensors 13 in the printer 1 may be two, or four or more. Still, the printer 1 preferably includes eight in-head temperature sensors 13 each being disposed at a position where a corresponding one of the eight nozzle groups 3A to 3H is disposed in the front-rear direction. In this case, the ink temperature at the respective positions where the eight nozzle groups 3A to 3H are disposed can be estimated based on the result of the detection by the eight in-head temperature sensors 13. Thus, the drive voltage applied to each of the piezoelectric elements 16A to 16H can be controlled to suppress the variation, along the front-rear direction, in the amount and the speed of the ink ejected from the plurality of nozzles 3*a*.

As in this modification, when the plurality of in-head temperature sensors 13 are disposed at an interval in the front-rear direction, one in-head heater 18 may be disposed at each of positions where the eight nozzle groups 3A to 3H are disposed, and the eight in-head heaters 18 may be individually controlled based on the results of the detection by the plurality of in-head temperature sensors 13 to suppress the variation, along the front-rear direction, in the ink temperature in the head 3. Still, according to the studies conducted by the inventors of the present application, even when the eight in-head heaters 18 are individually controlled based on the results of the detection by the plurality of in-head temperature sensors 13, since a change in the temperature of the in-head heaters 18 does not immediately lead to a change in the ink temperature in the head 3, the variation, along the front-rear direction, in the ink temperature in the head 3 is difficult to suppress.

Other Embodiments

The embodiment and the modification described above are examples of a preferred embodiment of the present invention. The present invention is not limited to these, and can be modified in various ways without changing the gist of the present invention.

In the embodiments described above, the printer 1 may include a flowmeter for detecting the flow rate of ink flowing into the head 3. In this case, the controller 9 determines the ink flow rate based on the result of detection by the flowmeter. In the embodiment described above, the controller 9 may calculate an amount of reduction in the temperature of the heating unit body 20 per unit time due to the ink flowing into the ink flow path of the heating unit body 20 based on the result of the detection by the head-external temperature sensor 22, and calculate the ink flow rate based on the amount of reduction in the temperature of the heating unit body 20 per unit time calculated.

In the embodiment described above, the printer 1 may include a temperature sensor for detecting the inflowing ink temperature that is the temperature of the ink flowing into the head 3. This temperature sensor is attached to the vicinity of the ink inflow port 3*i* of the head 3. In this case, the controller 9 determines the inflowing ink temperature based on the result of detection by the temperature sensor.

In the embodiment and the modification described above, the nozzle row 3*b* may be grouped into two to seven nozzle groups, and may be grouped into nine or more nozzle groups. In the embodiment and the modification described above, the plurality of nozzles 3*a* forming the nozzle rows 3*b* are evenly grouped into groups in the front-rear direction as illustrated in FIG. 11. Alternatively, when the inflowing ink temperature is lower than 45° C. and a change in the ink temperature in a front end side part in the head 3 is larger than a change in the ink temperature in a rear end side part in the head 3 (refer to FIG. 12 and FIG. 13), the plurality of nozzles 3*a* forming the nozzle row 3*b* may be grouped more in detail, in the front-rear direction, in the front end side part in the head 3 than in the rear end side part in the head 3.

For example, as illustrated in FIG. 14, the plurality of nozzles 3*a* forming the nozzle row 3*b* may be grouped into the eight nozzle groups 3A to 3H. In this case, even when a change in the ink temperature in the front end side part in the head 3 is larger than a change in the ink temperature in the rear end side part in the head 3, the variation, along the front-rear direction, in the amount and the speed of the ink ejected from the plurality of nozzles 3*a* can be effectively suppressed.

In the embodiment and the modification described above, the plurality of nozzles 3*a* forming the nozzle row 3*b* may not be grouped in advance in the front-rear direction. In this case, for example, the controller 9 may be able to individually control each of the plurality of piezoelectric elements 16. In this case, based on the result of estimating the ink temperature at each position in the front-rear direction in the head 3, the plurality of nozzles 3*a* forming the nozzle row 3*b* may be grouped with the distinction point being any position in the front-rear direction, so that the drive voltage applied to the piezoelectric element 16 corresponding to the nozzles 3*a* in each group can be more flexibly controlled.

In the embodiment and the modification described above, when the ink temperature on both end sides in the front-rear direction in the head 3 is lower than the ink temperature on the center side in the front-rear direction in the head 3, the controller 9 may set the drive voltage to the piezoelectric elements 16 that make the ink ejected from the nozzles 3*a* on both end sides in the front-rear direction to be higher than the drive voltage to the piezoelectric elements 16 that make the ink ejected from the nozzles 3*a* disposed on the center side in the front-rear direction. For example, the controller 9 may set the drive voltage to the piezoelectric elements 16A and 16H to be higher than the drive voltages to the piezoelectric elements 16B to 16G. In this case, the variation, along the front-rear direction, in the amount and the speed of the ink ejected from the plurality of nozzles 3*a* is suppressed, even when the ink temperature on both end sides in the front-rear direction in the head 3 is low.

In the embodiment and the modification described above, the head 3 may not include the in-head heater 18. In this case, the ink temperature on the rear end side in the head 3 is lower than the ink temperature on the front end side in the head 3. In the embodiment and the modification described above, the table in which the drive voltage to the piezoelectric element 16 and the ink temperature are associated with each other in advance may not be stored in the controller 9. In this case, the controller 9 performs a predetermined calculation based on the ink temperature to calculate the drive voltage to be applied to the piezoelectric element 16.

In the embodiment and the modification described above, the ejection energy generation element for making the nozzles 3*a* eject the ink is the piezoelectric element 16. Alternatively, the ejection energy generation element for making the nozzles 3*a* eject the ink may be a heater (heat emitting element). In other words, the printer 1 makes the nozzles 3*a* eject ink by a piezoelectric mechanism in the embodiment and the modification described above, but the printer 1 may make the ink ejected from the nozzle 3*a* by a thermal mechanism.

In the embodiment and the modification described above, the ink used in the printer 1 may be ink other than the UV ink, having viscosity that is high at a normal temperature and largely varies due to temperature change, or may be ink that does not have such characteristics. In the embodiment and the modification described above, the printer 1 may include, in place of the platen 8, a table on which the print medium 2 is placed, and a table drive mechanism that moves the table in the front-rear direction. In the embodiment and the modification described above, the printer 1 may be a 3D printer that produces a three-dimensional object.

The invention claimed is:

1. An inkjet printer configured to perform printing by ejecting ink, the inkjet printer comprising:

an inkjet head in which a plurality of nozzles that eject ink and a plurality of ink flow paths to which the plurality of nozzles are connected are formed; and a controller configured to control the inkjet printer, wherein the inkjet head includes a plurality of ejection energy generation elements each configured to make a corresponding one of the plurality of nozzles eject the ink, and the controller estimates temperature of the ink in each of the plurality of ink flow paths based on an ink flow rate that is a flow rate of the ink flowing into each of the plurality of ink flow paths and a first temperature that is a temperature outside the inkjet head, and controls drive voltage applied to the plurality of ejection energy generation elements based on a result of the estimation, wherein the inkjet head includes an in-head heater disposed inside the inkjet head and configured to heat the ink in the inkjet head, and an ink temperature in each of the plurality of ink flow paths is measured in advance in accordance with a target heating temperature of the ink heated by the in-head heater, as well as with various values of the ink flow rate and the first temperature, and a result of the measurement is stored in advance in the controller.

2. The inkjet printer as set forth in claim 1 further comprising an external temperature sensor configured to detect an external temperature of the inkjet printer, wherein the controller determines the ink flow rate in each of the plurality of ink flow paths based on print data input to the controller, and sets the external temperature detected by the external temperature sensor as the first temperature.

3. The inkjet printer as set forth in claim 2, wherein the ink temperature in each of the plurality of ink flow paths is measured in advance in accordance with various values of the ink flow rate and the first temperature, and a result of the measurement is stored in advance in the controller, and the controller estimates the ink temperature in each of the plurality of ink flow paths, based on the result of the measurement stored in the controller, as well as on the ink flow rate and the first temperature.

4. The inkjet printer as set forth in claim 1, wherein the ink temperature in each of the plurality of ink flow paths is measured in advance in accordance with various values of the ink flow rate and the first temperature, and a result of the measurement is stored in advance in the controller, and the controller estimates the ink temperature in each of the plurality of ink flow paths, based on the result of the measurement stored in the controller, as well as on the ink flow rate and the first temperature.

5. The inkjet printer as set forth in claim 1 further comprising an ink heating mechanism configured to heat ink supplied to the inkjet head, wherein the ink heating mechanism includes a heating unit body of a block shape in which a plurality of heating mechanism ink flow paths in which ink flows are formed, and a head-external heater configured to heat the heating unit body, each of the plurality of heating mechanism ink flow paths is connected to a corresponding one of the plurality of ink flow paths.

* * * * *